United States Patent
Sepulveda et al.

(10) Patent No.: US 10,386,995 B2
(45) Date of Patent: Aug. 20, 2019

(54) USER INTERFACE FOR COMBINABLE VIRTUAL DESKTOPS

(71) Applicant: Apple Inc., Cupertino, CA (US)

(72) Inventors: Raymond Sepulveda, Campbell, CA (US); Marcel Van Os, San Francisco, CA (US)

(73) Assignee: APPLE INC., Cupertino, CA (US)

( * ) Notice: Subject to any disclaimer, the term of this patent is extended or adjusted under 35 U.S.C. 154(b) by 464 days.

(21) Appl. No.: 14/736,637

(22) Filed: Jun. 11, 2015

(65) Prior Publication Data

US 2016/0162127 A1 Jun. 9, 2016

Related U.S. Application Data

(60) Provisional application No. 62/088,343, filed on Dec. 5, 2014.

(51) Int. Cl.
| | | |
|---|---|---|
| *G06F 3/048* | (2013.01) | |
| *G06F 3/0482* | (2013.01) | |
| *G06F 9/451* | (2018.01) | |
| *G06F 3/0481* | (2013.01) | |
| *G06F 3/0483* | (2013.01) | |
| *G06F 3/0484* | (2013.01) | |

(52) U.S. Cl.
CPC .......... *G06F 3/0482* (2013.01); *G06F 3/048* (2013.01); *G06F 3/0483* (2013.01); *G06F 3/04817* (2013.01); *G06F 3/04842* (2013.01); *G06F 9/452* (2018.02)

(58) Field of Classification Search
None
See application file for complete search history.

(56) References Cited

U.S. PATENT DOCUMENTS

| | | | |
|---|---|---|---|
| 5,394,521 A | 2/1995 | Henderson et al. | |
| 7,735,081 B2 | 6/2010 | Robinson et al. | |
| 9,001,047 B2 | 4/2015 | Forstall et al. | |
| 2007/0162864 A1* | 7/2007 | Masselle | G06F 3/0483 715/765 |
| 2008/0034317 A1 | 2/2008 | Fard et al. | |
| 2009/0083655 A1* | 3/2009 | Beharie | G06F 3/0481 715/781 |
| 2010/0115450 A1* | 5/2010 | Scott | G06F 3/0483 715/777 |

(Continued)

OTHER PUBLICATIONS

Kapil Kumar et al., Segregating User Data by Tabs in Web Browsers, Aug. 1, 2014, IEEE, pp. 322-327 (Year: 2014).*

(Continued)

*Primary Examiner* — Tam T Tran
(74) *Attorney, Agent, or Firm* — Fernando & Partners, LLP; Prateek Bhatnagar

(57) ABSTRACT

The embodiments herein describe user interfaces for virtual desktops displayed on an electronic device. In some embodiments, each virtual desktop is associated with a corresponding application. By instantiating multiple virtual desktops that are each associated with an application, one or more application windows for the application are displayed in a corresponding virtual desktop. In some embodiments, multiple virtual desktops can be merged so as to display application windows from multiple virtual desktops in a single merged virtual desktop.

22 Claims, 32 Drawing Sheets

(56) References Cited

U.S. PATENT DOCUMENTS

| | | | |
|---|---|---|---|
| 2010/0313156 A1 | 12/2010 | Louch et al. | |
| 2012/0096397 A1* | 4/2012 | Ording | G06F 3/04883 715/802 |
| 2013/0137415 A1* | 5/2013 | Takikawa | H04W 4/001 455/418 |
| 2013/0167090 A1* | 6/2013 | Tomizu | G06F 3/0482 715/835 |
| 2014/0033076 A1* | 1/2014 | Al-Alami | G06F 3/0481 715/753 |
| 2014/0115523 A1* | 4/2014 | Seo | G06F 3/0233 715/773 |

OTHER PUBLICATIONS

Mohd Faris et al., Virtual Desktop Environment on Cloud Computing PLatform, Aug. 2014, IEEE, pp. 80-84 (Year: 2014).*

PCT International Search Report and Written Opinion for PCT/US2015/051039, dated Dec. 23, 2015, 11 Pages.

Henderson, D.A., et al., "Rooms: The Use of Multiple Virtual Workspaces to Reduce Space Contention in a Window-Based Graphical User Interface," ACM Transactions on Graphics, Jul. 1986, pp. 211-243, vol. 5, No. 3.

Shailendravikram "Smart Desktop Full Version," 2011, 9 Pages, [online] [retrieved on Aug. 19, 2015] Retrieved from the internet <URL:http://shailendravikram.deviantart.com/art/Smart-Desktop-Full-Version-213366570>.

* cited by examiner

USER INTERFACE FOR COMBINABLE VIRTUAL DESKTOPS

CROSS-REFERENCE TO RELATED APPLICATIONS

This application claims the benefit of U.S. Provisional Patent Application No. 62/088,343 filed on Dec. 5, 2014, which is incorporated by reference in its entirety.

TECHNICAL FIELD

This relates generally to electronic devices for displaying user interfaces that improve user interaction with virtual desktops on the electronic devices.

BACKGROUND

A desktop environment of an electronic device is a graphical user interface (GUI) that allows for user interaction with files, applications, and other objects on the electronic device. The desktop environment of an electronic device is limited by the physical limits of the electronic device's display screen. Thus, the desktop environment can become cluttered with content due to the limited screen real estate of the display screen of the electronic device.

SUMMARY

In some embodiments, one or more virtual desktops are instantiated using software to expand the desktop environment of an electronic device beyond the physical limits of the electronic device's display screen. Each virtual desktop optionally is associated with a corresponding application. By instantiating multiple virtual desktops that are each associated with an application, one or more application windows for the application are displayed in a corresponding virtual desktop to de-clutter the desktop environment. However, the user can have a difficult time keeping track of the number of virtual desktops instantiated on the electronic device. In some embodiments, the electronic device concurrently displays a representation of each virtual desktop instantiated on the electronic device. The representations of the virtual desktops visually indicate to the user the virtual desktops available to the user. The representations of the virtual desktops are also used by the user to navigate between the different virtual desktops instantiated on the electronic device.

In some embodiments, multiple virtual desktops are combinable to create a merged virtual desktop. When multiple virtual desktops are combined, application windows displayed in each virtual desktop are displayed within the merged virtual desktop. Displaying the application windows of multiple virtual desktops within the merged virtual desktop allows the user to interact with multiple types of applications within a single virtual desktop.

In some embodiments, a computer-implemented method of an electronic device with a display comprises concurrently displaying a first virtual desktop that includes a first set of one or more open application windows and displaying a representation of a second virtual desktop. The second virtual desktop includes a second set of one or more open application windows. While concurrently displaying the first virtual desktop and the representation of the second virtual desktop, an input is detected that includes a selection of the representation of the second virtual desktop. In response to detecting the input, in accordance with a determination that the input meets virtual desktop merge criteria, a merged virtual desktop is displayed. The merged virtual desktop includes the first set of application windows and the second set of application windows.

Note that the various embodiments of the calendar application described above can be combined with any other embodiments described herein. The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

DETAILED DESCRIPTION

Figure 1A:
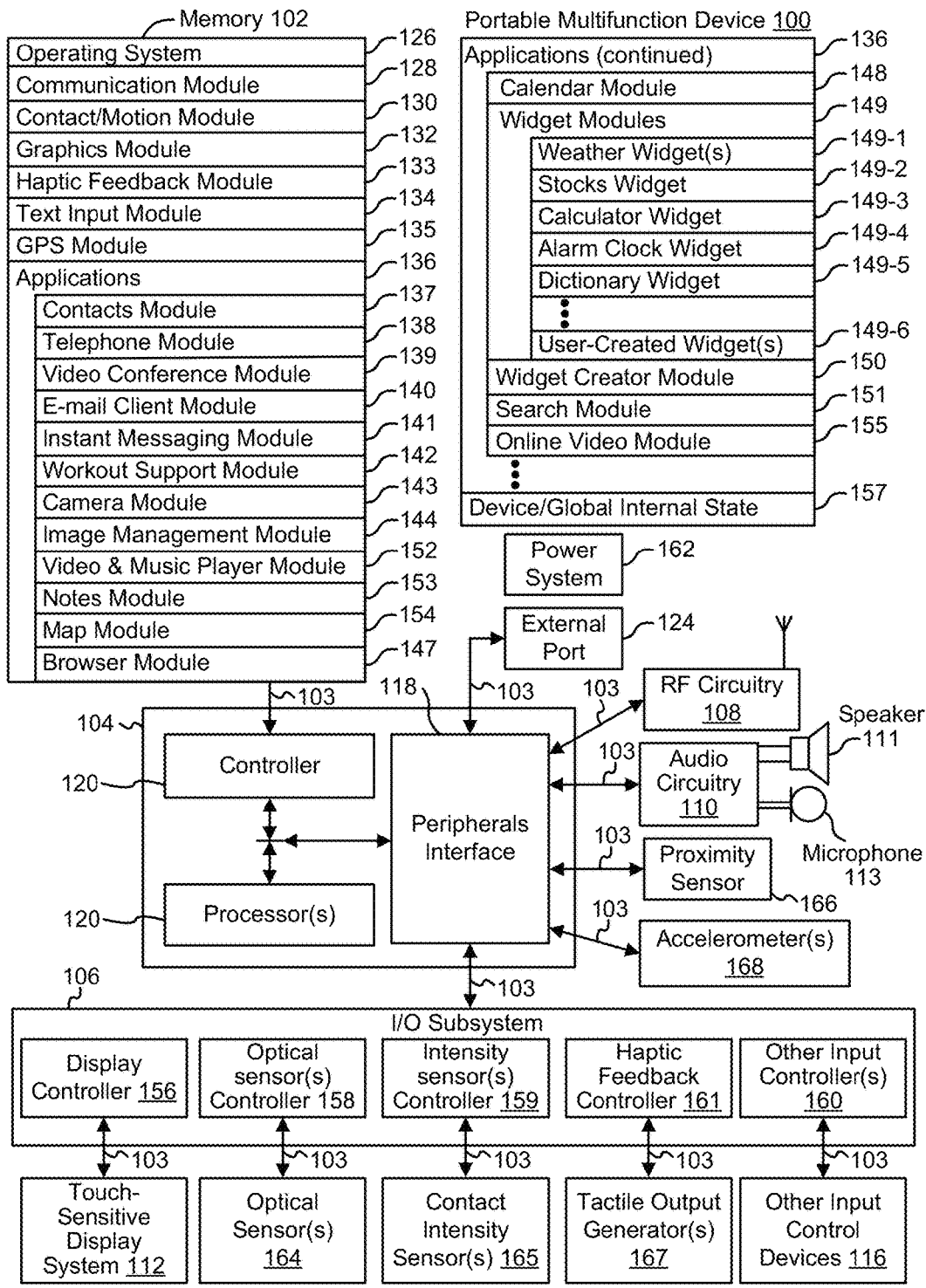
FIG. 1A is a block diagram illustrating a portable multifunction device with a touch-sensitive display in accordance with some embodiments.

Many electronic devices have a desktop user interface that includes multiple, application user interface (UI) elements referred to as icons or application icons. The desktop user interface optionally is referred to as an application launching interface, springboard, or an icon view of an electronic device. Each icon is associated with a corresponding application. The user can select an icon from the desktop user interface to execute a corresponding application on the computing device. Overtime, the desktop user interface displays multiple applications that clutter the desktop user interface.

To de-clutter the desktop user interface, the electronic device instantiates multiple virtual desktops in accordance with a user request. In some embodiments, each virtual desktop is associated with a corresponding application such that when an application is executed, a new virtual desktop is created for the application. Thus, the user may organize applications within separate virtual desktops according to the needs and work habits of the user as will be further described below.

Exemplary Devices

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touch pads), are, optionally, used. It should also be understood that, in some embodiments, the device is not a portable communications device, but is a desktop computer with a touch-sensitive surface (e.g., a touch screen display and/or a touch pad).

In the discussion that follows, an electronic device that includes a display and a touch-sensitive surface is described. It should be understood, however, that the electronic device optionally includes one or more other physical user-interface devices, such as a physical keyboard, a mouse and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive displays 112 in accordance with some embodiments. Touch-sensitive display 112 is sometimes called a "touch screen" for convenience, and is sometimes known as or called a touch-sensitive display system. Device 100 includes memory 102 (which optionally includes one or more computer readable storage mediums), memory controller 122, one or more processing units (CPU's) 120, peripherals interface 118, RF circuitry 108, audio circuitry 110, speaker 111, microphone 113, input/output (I/O) subsystem 106, other input or control devices 116, and external port 124. Device 100 optionally includes one or more optical sensors 164. Device 100 optionally includes one or more intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch sensitive surface, or to a substitute (proxy) for the force or pressure of a contact on the touch sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application specific integrated circuits.

Memory 102 optionally includes high-speed random access memory and optionally also includes non-volatile memory, such as one or more magnetic disk storage devices, flash memory devices, or other non-volatile solid-state memory devices. Access to memory 102 by other components of device 100, such as CPU 120 and the peripherals interface 118, is, optionally, controlled by memory controller 122.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data.

In some embodiments, peripherals interface 118, CPU 120, and memory controller 122 are, optionally, implemented on a single chip, such as chip 104. In some embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, intensity sensor controller 159, haptic feedback controller 161 and one or more input controllers 160 for other input or control devices. The one or more input controllers 160 receive/send electrical signals from/to other input or control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, infrared port, USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output corresponds to user-interface objects.

Touch screen 112 has a touch-sensitive surface, sensor or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and converts the detected contact into interaction with user-interface objects (e.g., one or more soft keys, icons, web pages or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in some embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone®, iPod Touch®, and iPad® from Apple Inc. of Cupertino, Calif.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lens, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device, so that the touch screen display is enabled for use as a viewfinder for still and/or video image acquisition. In some embodiments, another optical sensor is located on the front of the device so that the user's image is, optionally, obtained for videoconferencing while the user views the other video conference participants on the touch screen display.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112 which is located on the front of device 100.

Device 100 optionally also includes one or more proximity sensors 166. FIG. 1A shows proximity sensor 166 coupled to peripherals interface 118. Alternately, proximity sensor 166 is coupled to input controller 160 in 1/0 subsystem 106. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112 which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100 as described in U.S. patent application Ser. No. 11/969,800 filed on Jan. 4, 2008, which is incorporated by reference in its entirety.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments memory 102 stores device/global internal state 157, as shown in Figures IA and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod (trademark of Apple Inc.) devices.

Contact/motion module 130 optionally detects contact with touch screen 112 (in conjunction with display controller 156) and other touch sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined thresholds values without changing the trackpad or touch screen display hardware. Additionally, in some implementations a user of the device is provided with software settings for adjusting one or more of the set of intensity thresholds (e.g., by adjusting individual intensity thresholds and/or by adjusting a plurality of intensity thresholds at once with a system-level click "intensity" parameter).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds may include a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the third threshold results in a third operation. In some embodiments, a comparison between the characteristic intensity and one or more thresholds is used to determine whether or not to perform one or more operations (e.g., whether to perform a respective option or forgo performing the respective operation) rather than being used to determine whether to perform a first operation or a second operation.

In some embodiments, a portion of a gesture is identified for purposes of determining a characteristic intensity. For example, a touch-sensitive surface may receive a continuous swipe contact transitioning from a start location and reaching an end location, at which point the intensity of the contact increases. In this example, the characteristic intensity of the contact at the end location may be based on only a portion of the continuous swipe contact, and not the entire swipe contact (e.g., only the portion of the swipe contact at the end location). In some embodiments, a smoothing algorithm may be applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event.

Graphics module 132 includes various known software components for rendering and displaying graphics on touch screen 112 or other display, including components for changing the visual impact (e.g., brightness, transparency, saturation, contrast or other visual property) of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications 136 optionally include the following modules (or sets of instructions), or a subset or superset thereof:
- contacts module 137 (sometimes called an address book or contact list);
- telephone module 138;
- video conferencing module 139;
- e-mail client module 140;
- instant messaging (IM) module 141;
- workout support module 142;
- camera module 143 for still and/or video images;
- image management module 144;
- browser module 147;
- calendar module 148;
- widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
- widget creator module 150 for making user-created widgets 149-6;
- search module 151;
- video and music player module 152, which is, optionally, made up of a video player module and a music player module;
- notes module 153;
- map module 154; and/or
- online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch screen 112, display controller 156, contact module 130, graphics module 132, and text input module 134, telephone module 138 are, optionally, used to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication optionally uses any of a plurality of communications standards, protocols and technologies.

In conjunction with RF circuitry 108, audio circuitry 110, speaker 111, microphone 113, touch screen 112, display controller 156, optical sensor 164, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch screen 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages and to view received instant messages. In some embodiments, transmitted and/or received instant messages optionally include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact module 130, graphics module 132, text input module 134, GPS module 135, map module 154, and music player module 146, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store and transmit workout data.

In conjunction with touch screen 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display system controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch screen 112, display system controller 156, contact module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display system controller 156, contact module 130, graphics module 132, text input module 134, and browser module 147, the widget creator module 150 are, optionally, used by a user to create widgets (e.g., turning a user-specified portion of a web page into a widget).

In conjunction with touch screen 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display system controller 156, contact module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact module 130, graphics module 132, and text input module 134, notes module 153 includes executable instructions to create and manage notes, to do lists, and the like in accordance with user instructions.

In conjunction with RF circuitry 108, touch screen 112, display system controller 156, contact module 130, graphics module 132, text input module 134, GPS module 135, and browser module 147, map module 154 are, optionally, used to receive, display, modify, and store maps and data associated with maps (e.g., driving directions; data on stores and other points of interest at or near a particular location; and other location-based data) in accordance with user instructions.

In conjunction with touch screen 112, display system controller 156, contact module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules are, optionally, combined or otherwise re-arranged in various embodiments. In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some embodiments, the menu button is a physical push button or other physical input control device instead of a touchpad.

Figure 1B:
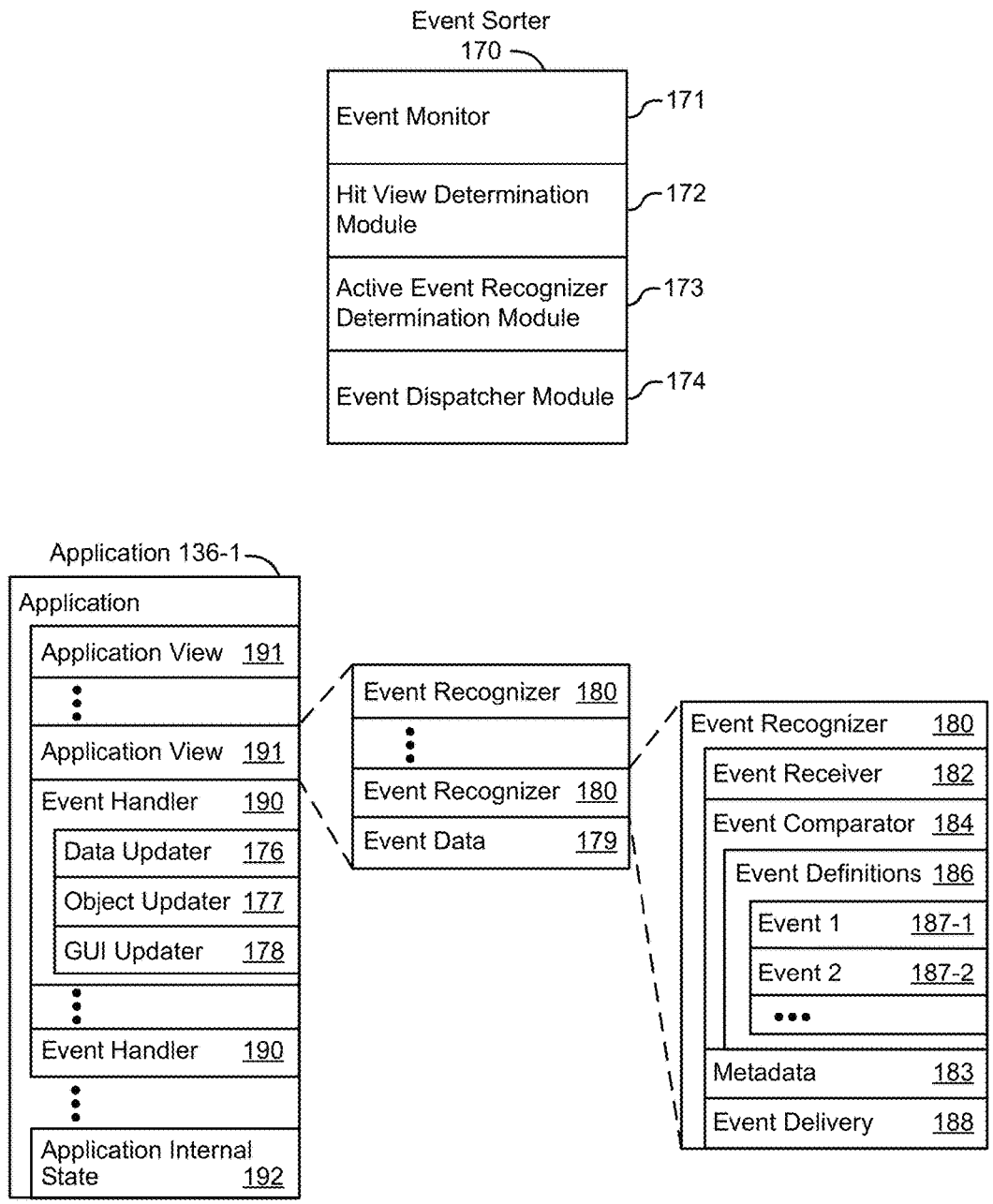
FIG. 1B is a block diagram illustrating exemplary components for event handling in accordance with some embodiments.

FIG. 1B is a block diagram illustrating exemplary components for event handling in accordance with some embodiments. In some embodiments, memory 102 (in Figures IA) or 370 (FIG. 3) includes event sorter 170 (e.g., in operating system 126) and a respective application 136-1 (e.g., any of the aforementioned applications 137-13, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In some embodiments, peripheral interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (i.e., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In some embodiments, active event recognizer determination module 173 determines that all views that include the physical location of a sub-event are actively involved views, and therefore determines that all actively involved views should receive a particular sequence of sub-events. In some embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver module 182.

In some embodiments, operating system 126 includes event sorter 170. Alternatively, application 136-1 includes event sorter 170. In yet some embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In some embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177 or GUI updater 178 to update the application internal state 192. Alternatively, one or more of the application views 191 includes one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170, and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event 187 include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and lift-off of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event 187 also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module 145. In some embodiments, object updater 177 creates and updates objects used in application 136-1. For example, object updater 176 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In some embodiments, they are included in two or more software modules.

It shall be understood that the foregoing discussion regarding event handling of user touches on touch-sensitive displays also applies to other forms of user inputs to operate multifunction devices 100 with input-devices, not all of which are initiated on touch screens. For example, mouse movement and mouse button presses, optionally coordinated with single or multiple keyboard presses or holds; contact movements such as taps, drags, scrolls, etc., on touch-pads; pen stylus inputs; movement of the device; oral instructions; detected eye movements; biometric inputs; and/or any combination thereof optionally are utilized as inputs corresponding to sub-events which define an event to be recognized.

Figure 2:
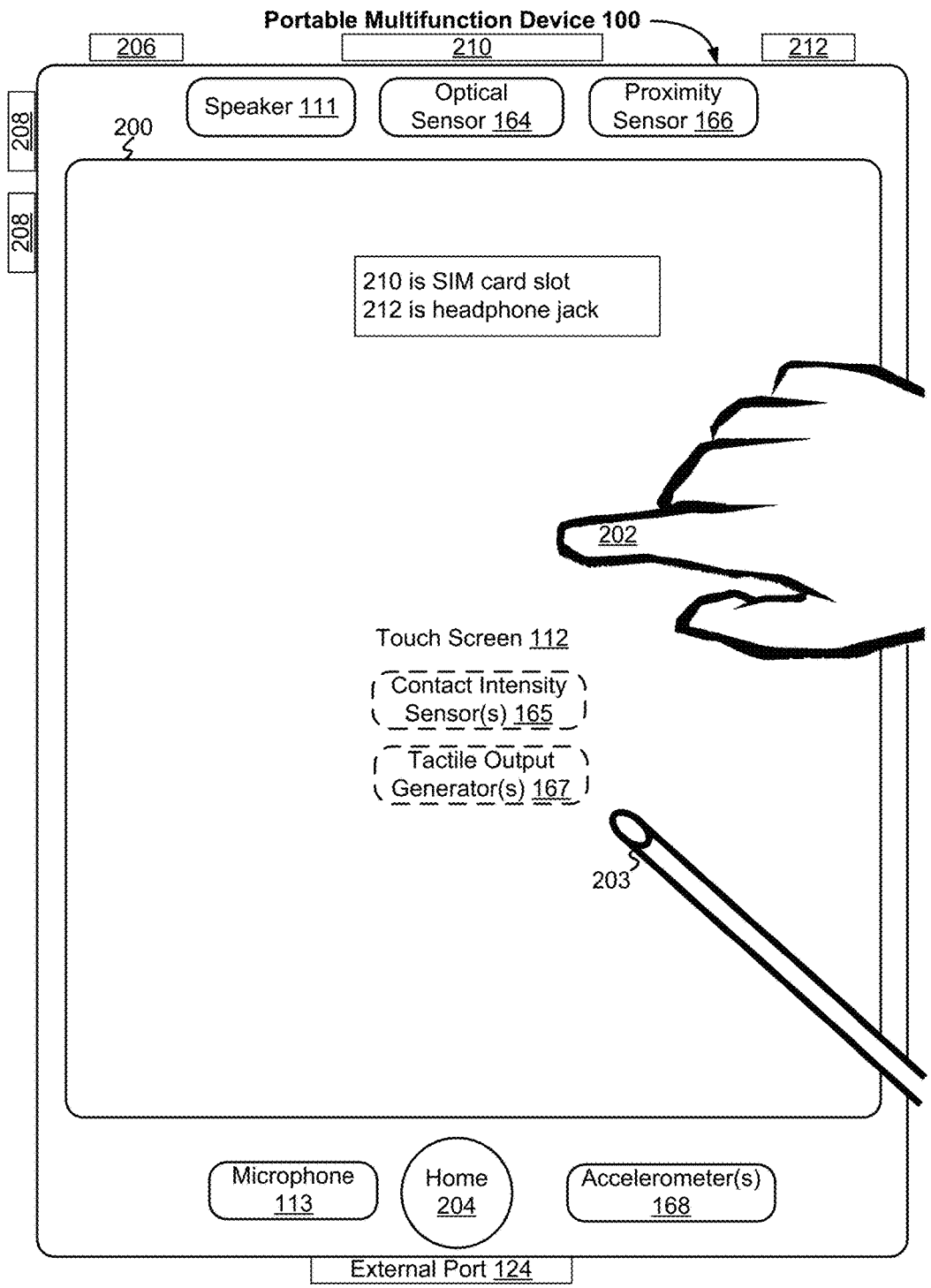
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward) and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also includes one or more physical buttons, such as "home" or menu button 204. As described previously, menu button 204 is, optionally, used to navigate to any application 136 in a set of applications that are, optionally, executed on device 100. In some embodiments, the menu button 204 includes a fingerprint sensor that identifies a fingerprint on the menu button 204. The fingerprint sensor optionally is used to determine whether a finger on the menu button 204 has a fingerprint that matches a fingerprint used to unlock the device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, Subscriber Identity Module (SIM) card slot 210, head set jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

Figure 3:
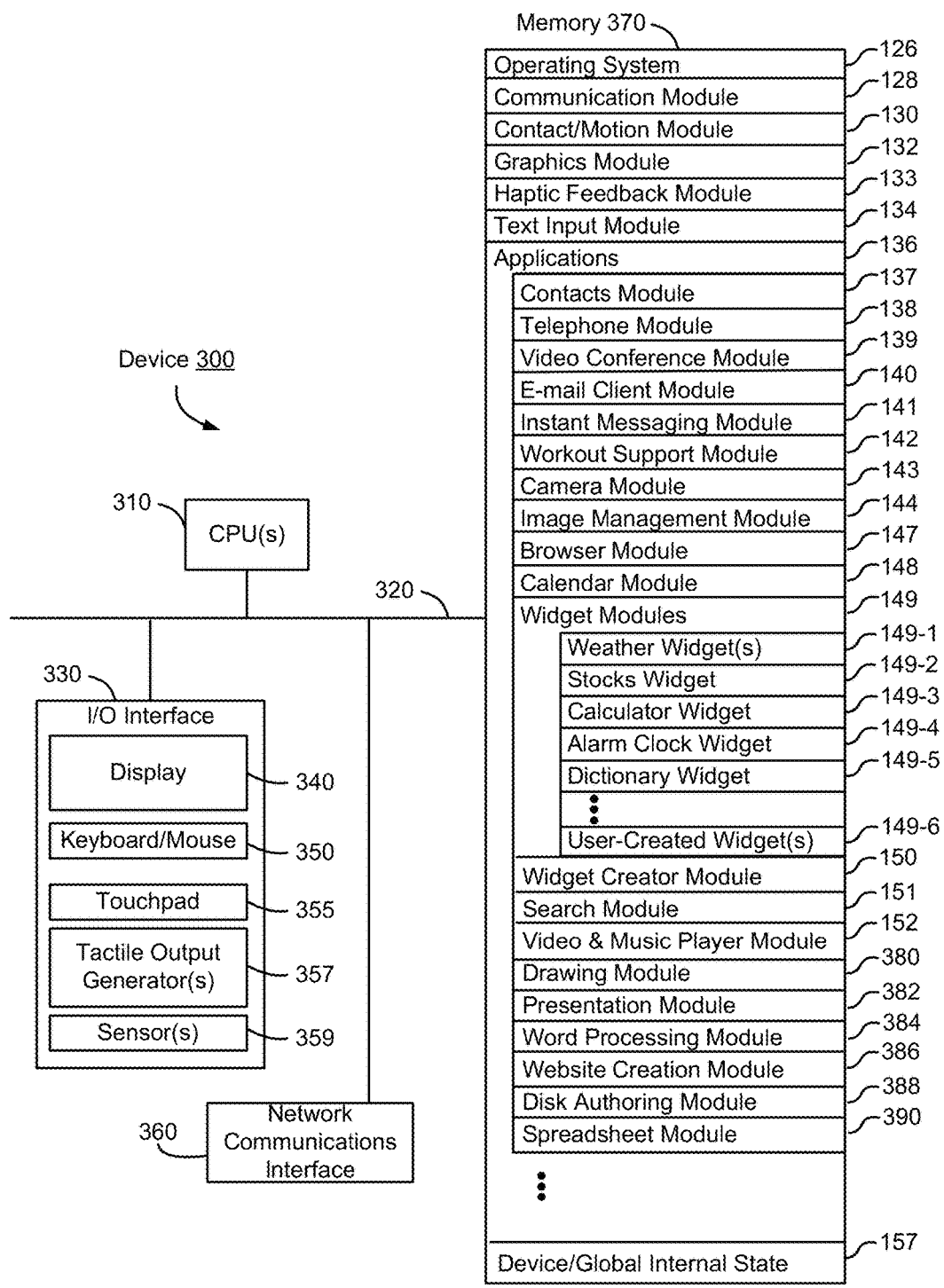
FIG. 3 is a block diagram of an exemplary multifunction device with a display and a touch-sensitive surface in accordance with some embodiments.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPU's) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (1/0) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to Figure IA). Memory 370 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above identified elements in FIG. 3 are, optionally, stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules are, optionally, combined or otherwise re-arranged in various embodiments. In some embodiments, memory 370 optionally stores a subset of the modules and data structures identified above. Furthermore, memory 370 optionally stores additional modules and data structures not described above.

Attention is now directed towards embodiments of user interfaces ("UI") that is, optionally, implemented on portable multifunction device 100.

Figure 4A:
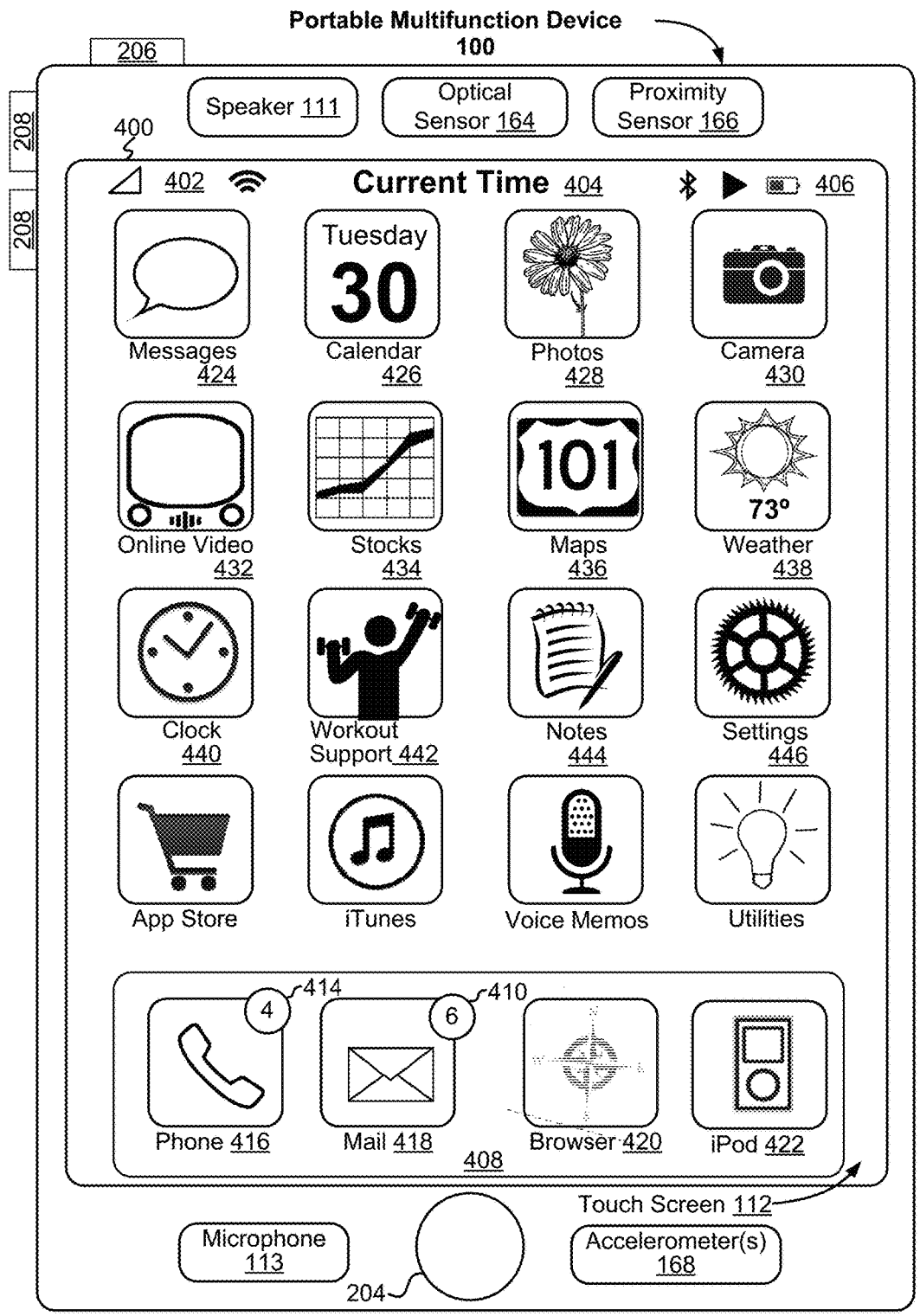
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;

Time 404;

Bluetooth indicator 405;

Battery status indicator 406;

Tray 408 with icons for frequently used applications, such as:

Icon 416 for telephone module 138, labeled "Phone," which optionally includes an indicator 414 of the number of missed calls or voicemail messages;

Icon 418 for e-mail client module 140, labeled "Mail," which optionally includes an indicator 410 of the number of unread e-mails;

Icon 420 for browser module 147, labeled "Browser;" and

Icon 422 for video and music player module 152, also referred to as iPod (trademark of Apple Inc.) module 152, labeled "iPod;" and Icons for other applications, such as:

Icon 424 for IM module 141, labeled "Text;"

Icon 426 for calendar module 148, labeled "Calendar;"

Icon 428 for image management module 144, labeled "Photos;"

Icon 430 for camera module 143, labeled "Camera;"

Icon 432 for online video module 155, labeled "Online Video"

Icon 434 for stocks widget 149-2, labeled "Stocks;"

Icon 436 for map module 154, labeled "Map;"

Icon 438 for weather widget 149-1, labeled "Weather;"

Icon 440 for alarm clock widget 149-4, labeled "Clock;"

Icon 442 for workout support module 142, labeled "Workout Support;"

Icon 444 for notes module 153, labeled "Notes;" and

Icon 446 for a settings application or module, which provides access to settings for device 100 and its various applications 136.

It should be noted that the icon labels illustrated in FIG. 4A are merely exemplary. For example, icon 422 for video and music player module 152 are labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
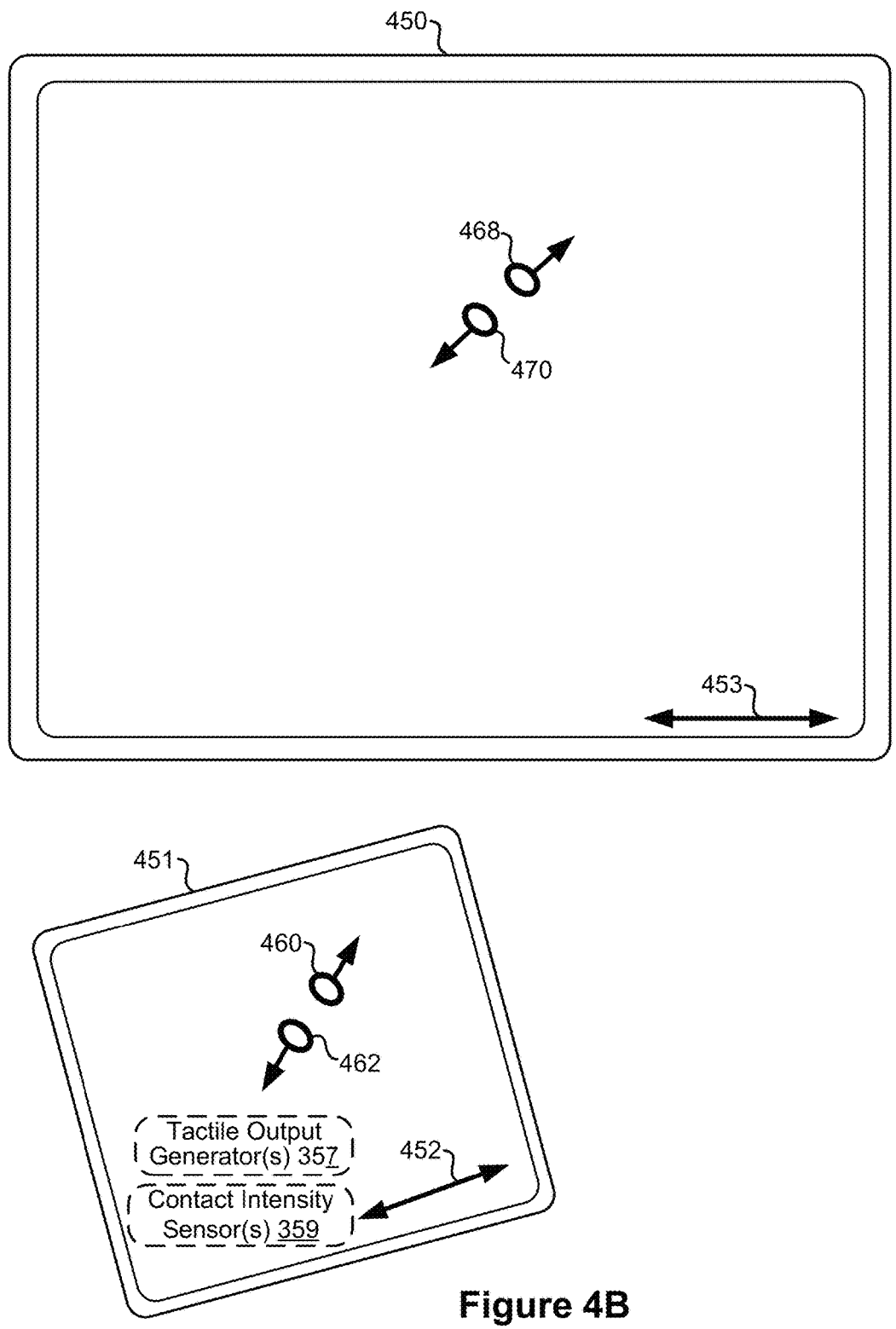
FIG. 4B illustrates an exemplary user interface for a multifunction device with a touch-sensitive surface that is separate from the display in accordance with some embodiments.

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 357) for detecting intensity of contacts on touch-sensitive surface 451 and/or one or more tactile output generators 359 for generating tactile outputs for a user of device 300.

Although some of the examples which follow will be given with reference to inputs on touch screen display 112 (where the touch sensitive surface and the display are combined), in some embodiments, the device detects inputs on a touch-sensitive surface that is separate from the display, as shown in FIG. 4B. In some embodiments the touch sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

As used herein, the term "focus selector" refers to an input element that indicates a current part of a user interface with which a user is interacting. In some implementations that include a cursor or other location marker, the cursor acts as a "focus selector," so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider or other user interface element), the particular user interface element is adjusted in accordance with the detected input. In some implementations that include a touch-screen display (e.g., touch-sensitive display system 112 in FIG. 1A or touch screen 112 in FIG. 4A) that enables direct interaction with user interface elements on the touch-screen display, a detected contact on the touch-screen acts as a "focus selector," so that when an input (e.g., a press input by the contact) is detected on the touch-screen display at a location of a particular user interface element (e.g., a button, window, slider or other user interface element), the particular user interface element is adjusted in accordance with the detected input. In some implementations focus is moved from one region of a user interface to another region of the user interface without corresponding movement of a cursor or movement of a contact on a touch-screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch-screen display) that is controlled by the user so as to communicate the user's intended interaction with the user interface (e.g., by indicating, to the device, the element of the user interface with which the user is intending to interact). For example, the location of a focus selector (e.g., a cursor, a contact or a selection box) over a respective button while a press input is detected on the touch-sensitive surface (e.g., a touchpad or touch screen) will indicate that the user is intending to activate the respective button (as opposed to other user interface elements shown on a display of the device).

User Interfaces and Associated Processes

Attention is now directed towards embodiments of user interfaces ("UI") and associated processes that may be implemented on an electronic device with a display, such as device 300 or portable multifunction device 100. Although the description below is with respect to device 300, the embodiments herein can be incorporated in device 100.

Figure 5A:
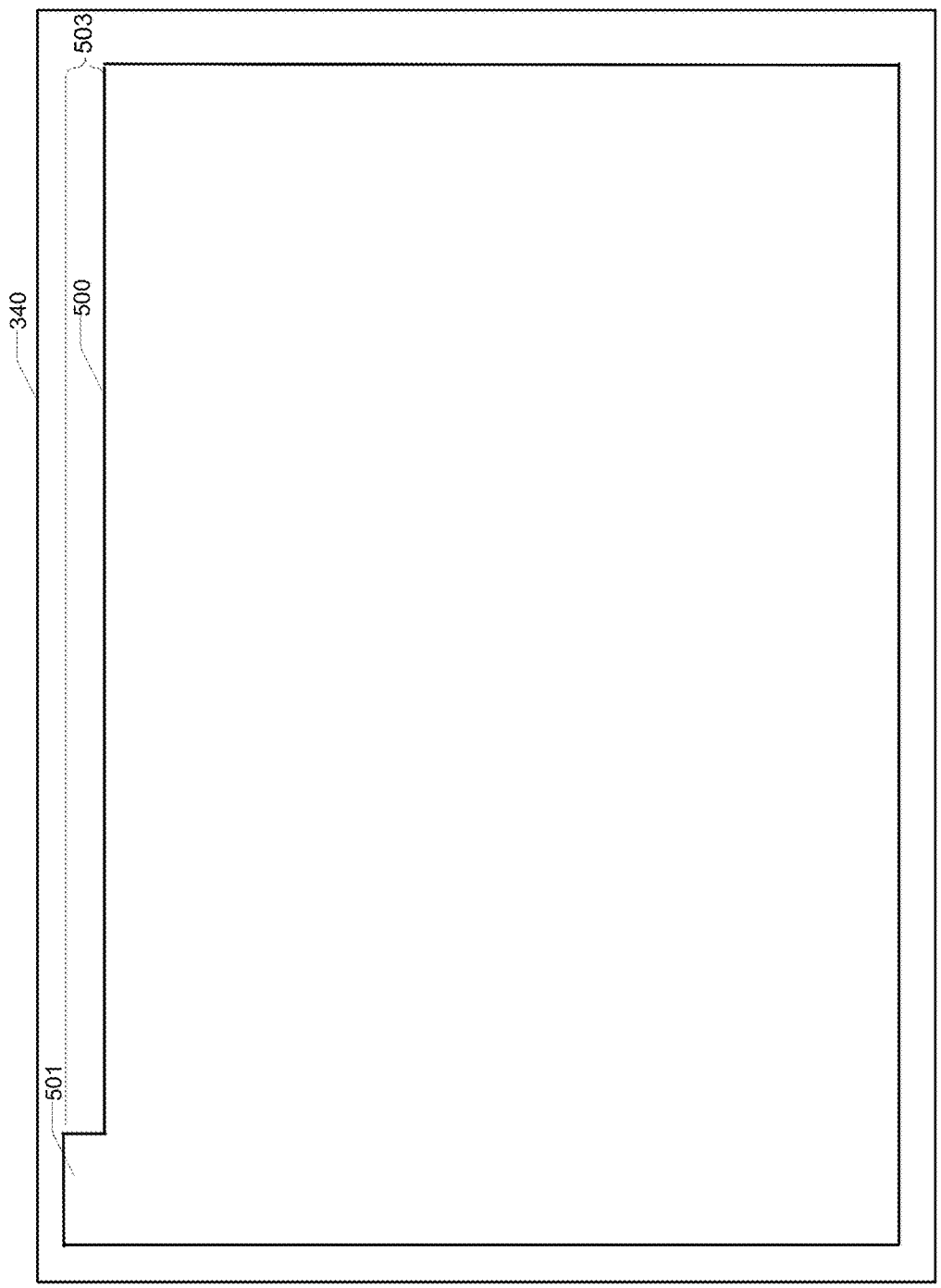
FIGS. 5A and 5B illustrate exemplary user interfaces of a virtual desktop in accordance with some embodiments.

FIG. 5A illustrates a virtual desktop user interface (hereinafter referred to as a "desktop" or a "virtual desktop") in accordance with some embodiments. The virtual desktop shown in FIG. 5A lacks any content and is used to describe the components of a virtual desktop. Generally, a virtual desktop is a space that contains a graphical user interface of the device 300. In some embodiments, the device 300 creates multiple virtual desktops that each are associated with an application. For example, the device 300 can create a first virtual desktop associated with a web browser application for browsing the Internet and the device 300 can also create a second virtual desktop associated with a calendar application for viewing calendar entries.

As shown in FIG. 5A, a virtual desktop is a window 500 drawn by device 300. User interface elements are displayed within the window 500. The window 500 includes a tab control 501 (or tab). A tab control 501 is a graphical user interface element used to navigate between virtual desktops displayed on display 340 as will be further described below. In some embodiments, a tab control is a representation of an associated virtual desktop. A tab control for a virtual desktop optionally includes text of the name of the application associated with the virtual desktop or a symbol that represents the application associated with the virtual desktop. That is, an application associated with a tab control is visually represented in the tab control by the text or icon of the application.

In some embodiments, the tab control 501 is displayed in a tab display region 503 of device 300. The tab display region 503 is an area of the display screen 340 used for displaying one or more tab controls. As shown in FIG. 5A, the tab display region 503 is displayed near the top of the display 340. However, the tab display region 503 optionally is displayed in other areas of the display 340 such as near the bottom of the display 340, near the left side of the display 340, or near the right side of the display 340. In some embodiments, the device 300 includes only a single menu bar that is persistently displayed and the tab display region 503 is representative of the single menu bar. Selection of a representation (e.g., a tab control) of a respective virtual desktop while the respective virtual desktop is displayed causes a menu bar of the respective application to be displayed, while selection of a representation of a respective virtual desktop while the respective virtual desktop is not displayed causes the respective virtual desktop to be displayed, as will be further described below.

Figure 5B:
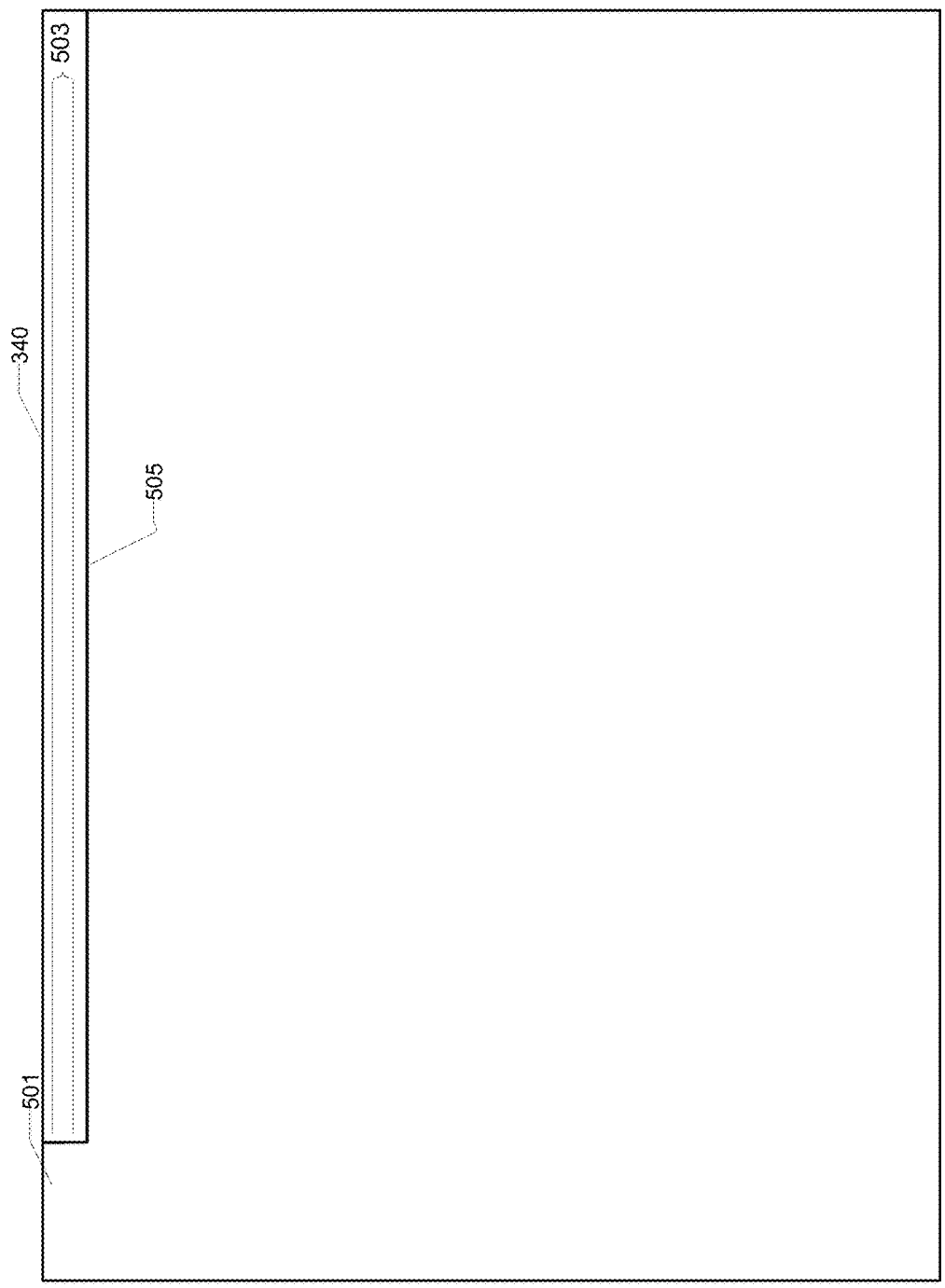

FIG. 5B illustrates a full screen virtual desktop according to some embodiments. The virtual desktop shown in FIG. 5B is similar to the virtual desktop shown in FIG. 5A. However, in FIG. 5B the window 505 drawn by device 300 to represent the virtual desktop is displayed in a full screen mode. During the full screen mode, window 505 representing the virtual desktop occupies the entirety of the display 340 except for the region assigned to the tab display region 503. In contrast, the window 500 shown in FIG. 5A is inset within the display screen 340.

Figure 6:
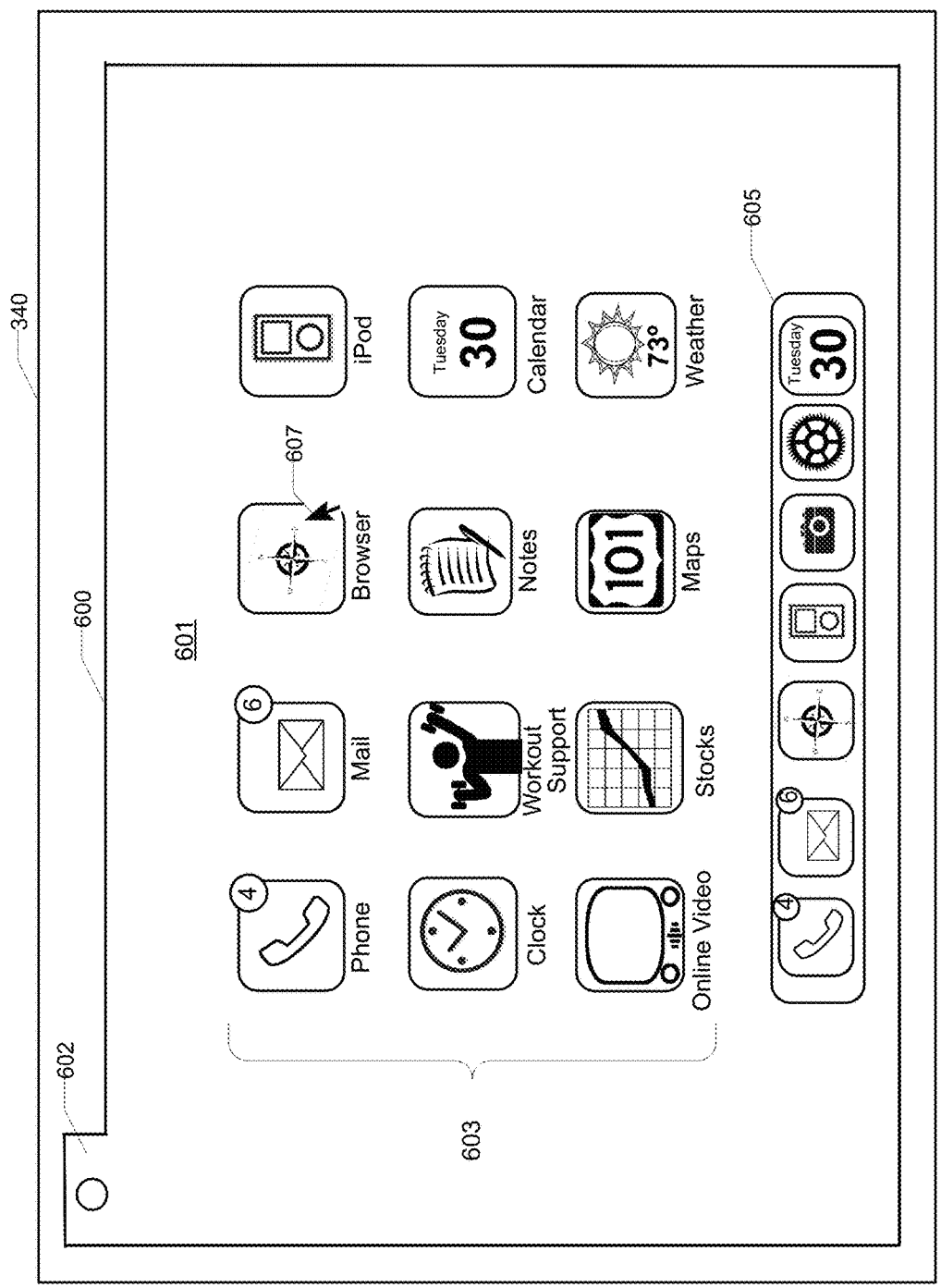
FIG. 6 illustrates an exemplary virtual desktop including an application launching user interface in accordance with some embodiments.

FIG. 6 illustrates a virtual desktop 600 (e.g., a first virtual desktop) including an exemplary application launching interface 601 and a tab control 602. The tab control 602 displayed in the tab display region 503 includes a symbol (e.g., a circle) that represents the application launching interface 601. Generally, a tab control is displayed in either an activate state or an inactivate state based on whether the virtual desktop represented by the tab control is displayed by device 300.

In some embodiments, the device 300 visually indicates whether a tab control is in an active state or an inactivate state based on the color of the tab control. For example, the inactive state of a tab control is visually represented by a different color than a tab control in an active state such as being displayed in a darker color (e.g., grey). Conversely, an active state of a tab control is visually represented by a different color than a tab control in the inactive state such as being displayed in a lighter color (e.g., white). In FIG. 6, device 300 displays the tab control 602 in a lighter color indicating that the tab control is in the active state since the virtual desktop 600 is currently displayed on device 300.

In some embodiments, the application launching interface 601 is displayed in a full screen mode that occupies the entirety of the virtual desktop 600 as shown in FIG. 6. The full screen mode optionally is referred to as an expanded mode. The application launching interface 601 includes multiple, application user interface (UI) elements referred to as icons, application icons, or application launch user interface objects. An icon can be an application icon or a document icon associated with a corresponding application. The device 300 detects a selection of an icon from the application launching interface 601 and executes a corresponding application on the device 300 in response to the detection.

In some embodiments, the application launching interface 601 includes two regions: an icon region 603 and a favorites region 605 (e.g., a tray or dock). As shown in FIG. 6, the icon region 603 is displayed above the favorites region 605. However, the icon region 603 and the favorites region 605 optionally are displayed in other positions than shown in FIG. 6.

The icon region 603 includes multiple icons representative of the applications on the device 300. In some embodiments, the icon region 603 is a navigable icon region. The icon region 603 optionally includes multiple pages of icons. The pages of the icon region 603 are scrollable to display the icons across the different pages. Examples of icons included in the icon region include a calendar icon corresponding to a calendar application, a clock icon corresponding to a clock application, a mail icon corresponding to a mail application, a weather icon corresponding to a weather application, a browser icon corresponding to a web browser application, a notes icon corresponding to a note pad application, and a map icon corresponding to a map application. Note that in some embodiments, different icons optionally are included in the icon region 603 than those described herein. In some embodiments, icon region 603 includes a plurality of pages and can be translated (e.g., scrolled or paged) laterally (e.g., horizontally) so that some of the icons in icon region 603 cease to be displayed and additional icons not displayed in FIG. 6 are displayed in icon region 603, while the favorites region 605 remains stationary.

The favorites region 605 optionally includes icons of the user's favorite applications on the device 300. Initially, the favorites region 605 includes a set of default icons, according to some embodiments. The user can customize the favorites region 605 to include other icons than the default icons. In some embodiments, the user customizes the favorites region 605 by selecting an icon from the icon region 603 and dragging and dropping the selected icon into the favorites region 605 to add the icon to the favorites region 605. To remove an icon from the favorites region 605, the user selects an icon displayed in the favorites region for a threshold amount of time which causes the computing device 300 to display a control to remove the icon. User selection of the control causes the device 300 to remove the icon from the favorites region 605. In some embodiments, rather than displaying a tab control in the tab display region 503 to represent a virtual desktop, the device 300 displays a representation of the virtual desktop in the favorites region 605. The representation of a virtual desktop displayed in the favorites region 605 optionally is an icon of the virtual desktop.

As mentioned previously, the user optionally selects an icon from the application launching interface 601 to execute the corresponding application on device 300. The device 300 detects a selection of an icon such as a click of cursor 607 on the browser icon shown in FIG. 6. In some embodiments, the device 300 determines whether there is a preexisting virtual desktop for a particular application in response to detecting a selection of an icon associated with the application. If a virtual desktop for the application preexists, the device 300 opens another application window (e.g., a new application window that was not already open) within the preexisting virtual desktop for the application and switches to displaying the preexisting virtual desktop rather than instantiate a new virtual desktop for the application. Thus, device 300 displays multiple instances of the same application (or multiple windows of the same instance of the application) within a single virtual desktop that is associated with the application. If a virtual desktop for the application does not preexist, the device 300 instantiates a virtual desktop for the application associated with the selected icon.

In the example shown in FIG. 6, a virtual desktop for the web browser application does not preexist. That is, the device 300 has not created a virtual desktop for the web browser application since the web browser application is not currently executed on the device 300. In response to detecting the selection of the web browser icon, device 300 inactivates (e.g., dismisses) the representation (e.g., tab control 602) of the application launching user interface 601 to no longer display the application launching user interface 601. The device 300 instantiates a new virtual desktop for the application associated with the selected icon and creates the tab control representing the virtual desktop. By inactivating the virtual desktop 600, the application launching interface 601 is no longer displayed on the display 340 of device 300 and the tab control 602 is displayed in the inactive state.

Figure 7A:
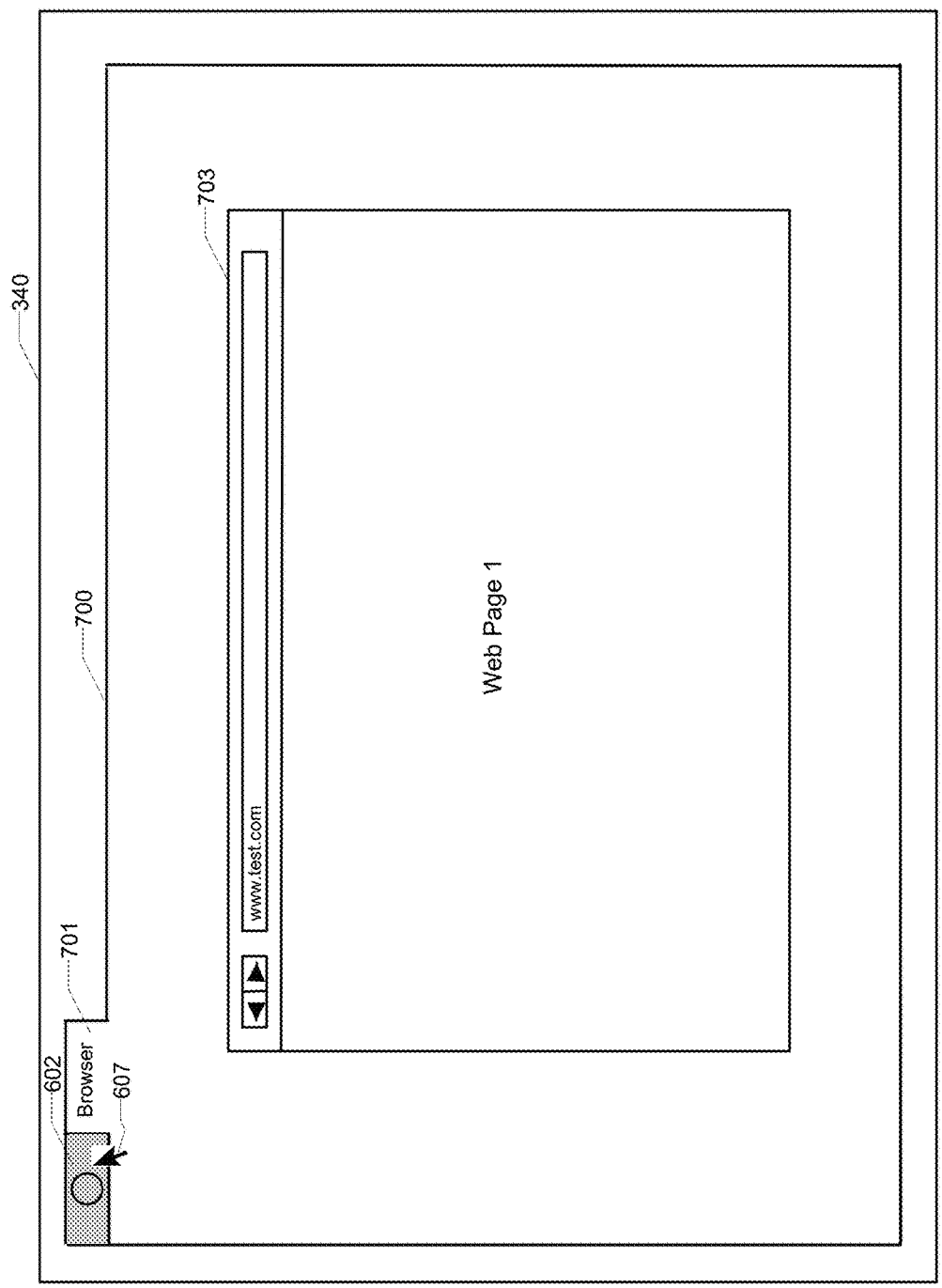
FIGS. 7A, 7B, and 7C illustrate exemplary user interfaces for instantiating a virtual desktop user interface associated with a browser application in accordance with some embodiments.

For example, FIG. 7A illustrates a virtual desktop 700 (e.g., a second virtual desktop) instantiated (e.g., generated)

by the device 300 in accordance with some embodiments. In response to detecting the selection of the web browser icon shown in FIG. 6, the device 300 dismisses the virtual desktop 600 displaying the application launching interface 601 and instantiates the virtual desktop 700 for the web browser application. The virtual desktop 700 includes a web browser window 703. The web browser window 703 is an example of an application window displayed within a virtual desktop. The web browser window 703 displays a web page (e.g., web page 1) requested by the user of device 300.

In some embodiments, the device 300 closes a virtual desktop in response to detecting an input closing the only application window displayed within the virtual desktop. For example, if the device 300 detects input closing web browser window 703, the device 300 closes virtual desktop 700 in response to the detection. By closing the virtual desktop 700, the tab control and virtual desktop are no longer displayed on the device 300.

As shown in FIG. 7A, the virtual desktop 700 also includes a tab control 701 (e.g., a second tab control) in tab control region 503. The tab control 701 is a representation of the virtual desktop 700 that is concurrently displayed with the virtual desktop 700 and the tab control 602. The tab control 701 includes the label "browser" to visually indicate that the virtual desktop 700 is associated with the web browser application. As shown in FIG. 7A, the device 100 concurrently displays the tab control 602 that represents the virtual desktop 600 and the tab control 701 that represents the virtual desktop 700. Tab control 701 is displayed in the activate state since its associated virtual desktop 700 is currently displayed on device 300. In contrast, tab control 602 is displayed in the inactive state since virtual desktop 600 is dismissed from being displayed on device 300.

As mentioned previously, tab controls are a graphical UI element used to navigate between different virtual desktops displayed on device 300. The device 300 displays a particular virtual desktop in response to the detection of a selection of a tab control for the virtual desktop. For example, in FIG. 7A the device 300 detects the selection of tab control 602 that represents the virtual desktop 600 including the application launching user interface 601 while concurrently displaying the virtual desktop 700 and the tab control 602. The selection is represented by the cursor 607 clicking on tab control 602 in FIG. 7A.

Figure 7B:
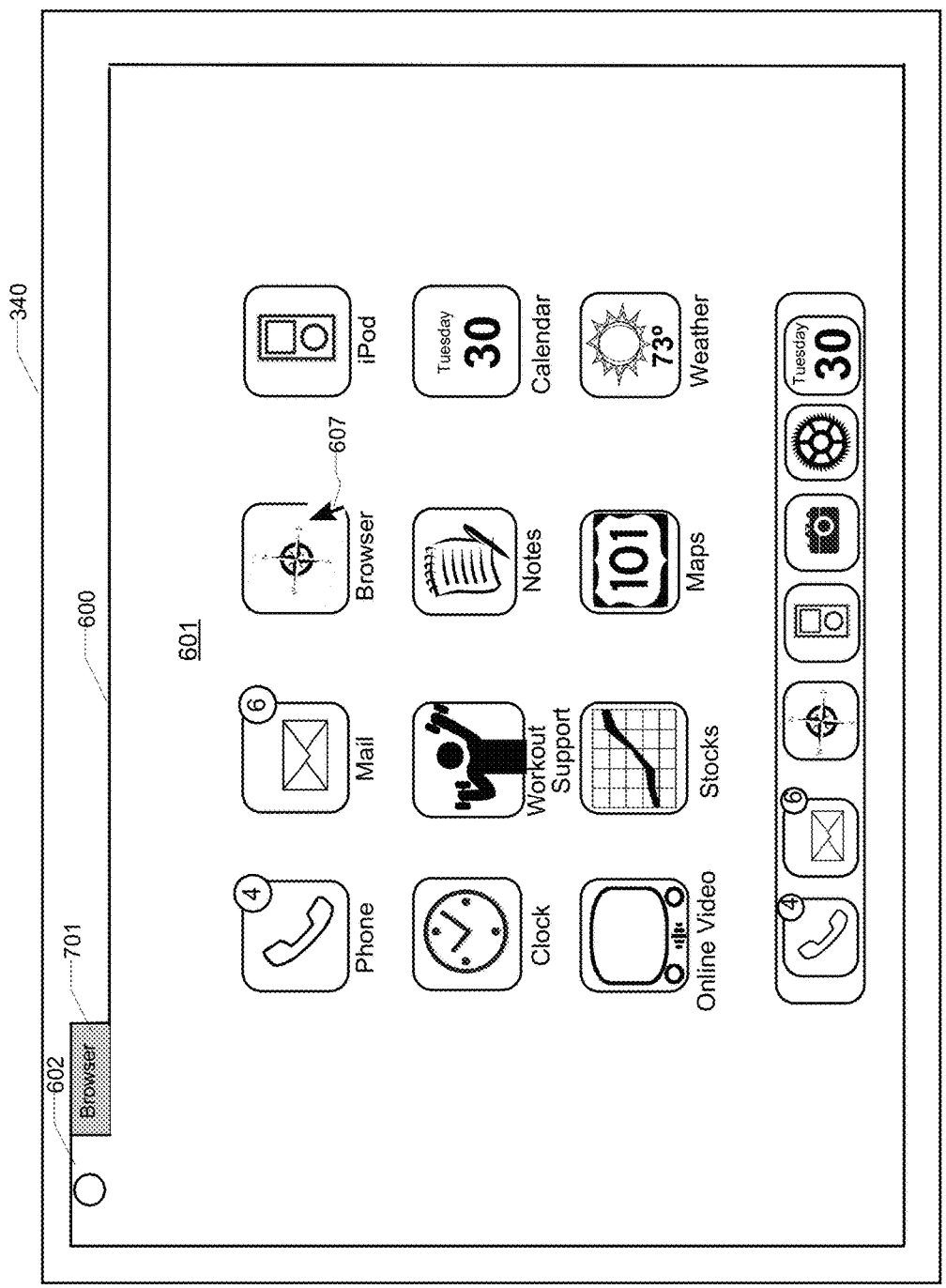

In response to detecting the selection of tab control 602, the device 300 dismisses the virtual desktop 700 including the web browser window 703 and displays the virtual desktop 600 including the application launching interface 601 as shown in FIG. 7B. That is, in response to detecting selection of the representation of the application launching user interface 601, the device 300 replaces display of the virtual desktop 700 with the application launching user interface 601 included in the virtual desktop 600. In FIG. 7B, tab control 602 for virtual desktop 600 is now displayed in the active state indicating that virtual desktop 600 is currently displayed on device 300 and tab control 701 for virtual desktop 700 is displayed in the inactive state indicating that the virtual desktop 700 is not currently displayed on device 300.

As shown in FIG. 7B, device 300 detects another selection of the web browser icon. As mentioned previously, the device 300 determines whether a virtual desktop already exists for a particular application in response to detecting a request to open an application. In the example shown in FIG. 7B, virtual desktop 700 for the web browser application already exists on device 300. Thus, device 300 displays another web browser window (e.g., a second application window) within the virtual desktop 700 for the web browser application rather than instantiate a new virtual desktop for the web browser application.

Figure 7C:
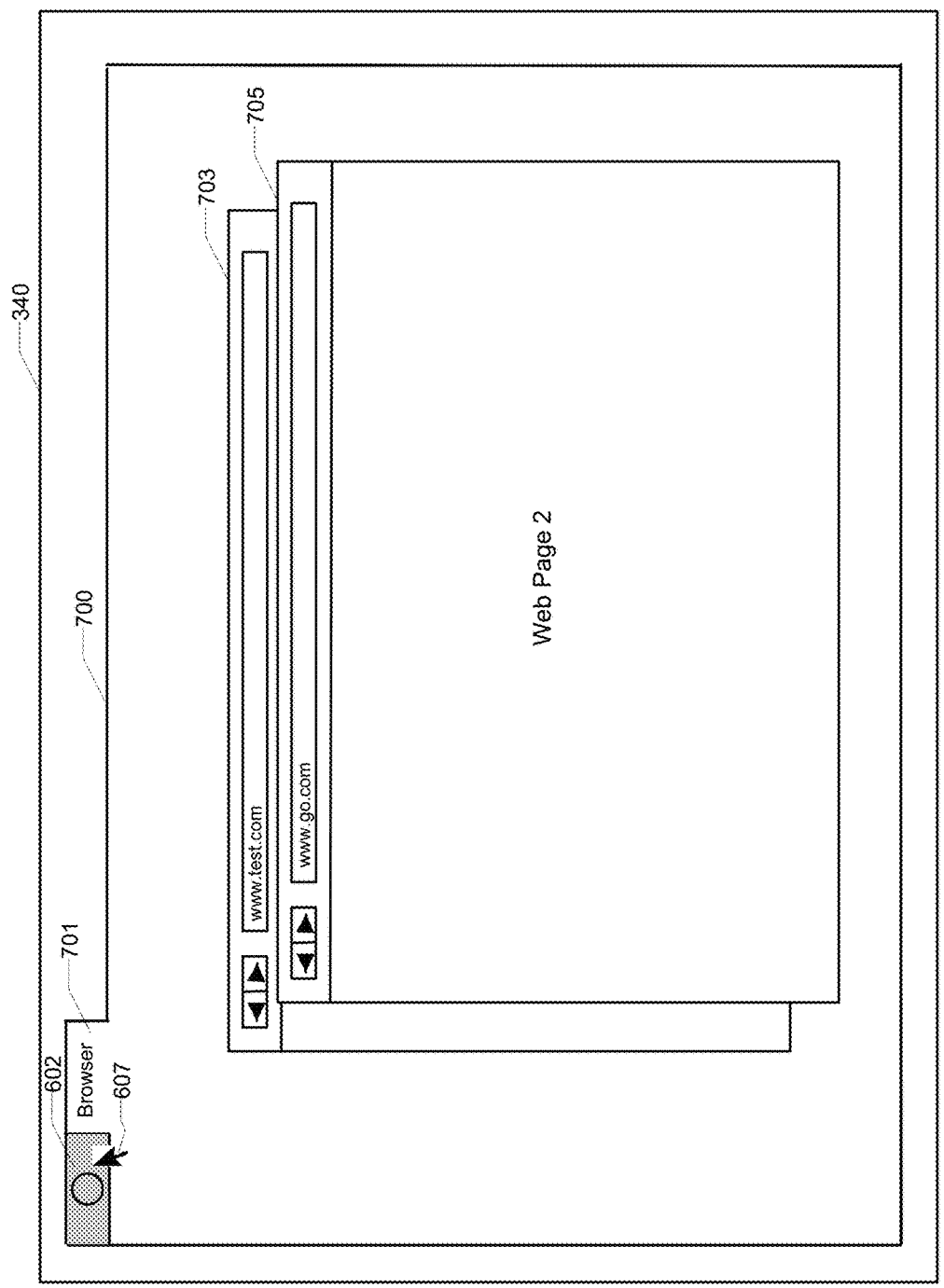

For example, as shown in FIG. 7C, the device 300 dismisses the virtual desktop 600 displaying the application launching user interface 601 and displays the virtual desktop 700 that is associated with the web browser application. The device 300 updates the virtual desktop 700 to include a second web browser window 705 in addition to web browser window 703 rather than instantiate a new virtual desktop for the second instance of the web browser window. In alternative embodiments, the device 300 creates a new virtual desktop for an application even though a virtual desktop for the application already exists. For example, in response to detecting selection of web browser icon in FIG. 7B, the device 300 creates a third virtual desktop that displays the web browser window 705 rather than include the web browser window 705 in the virtual desktop 700.

Figure 8A:
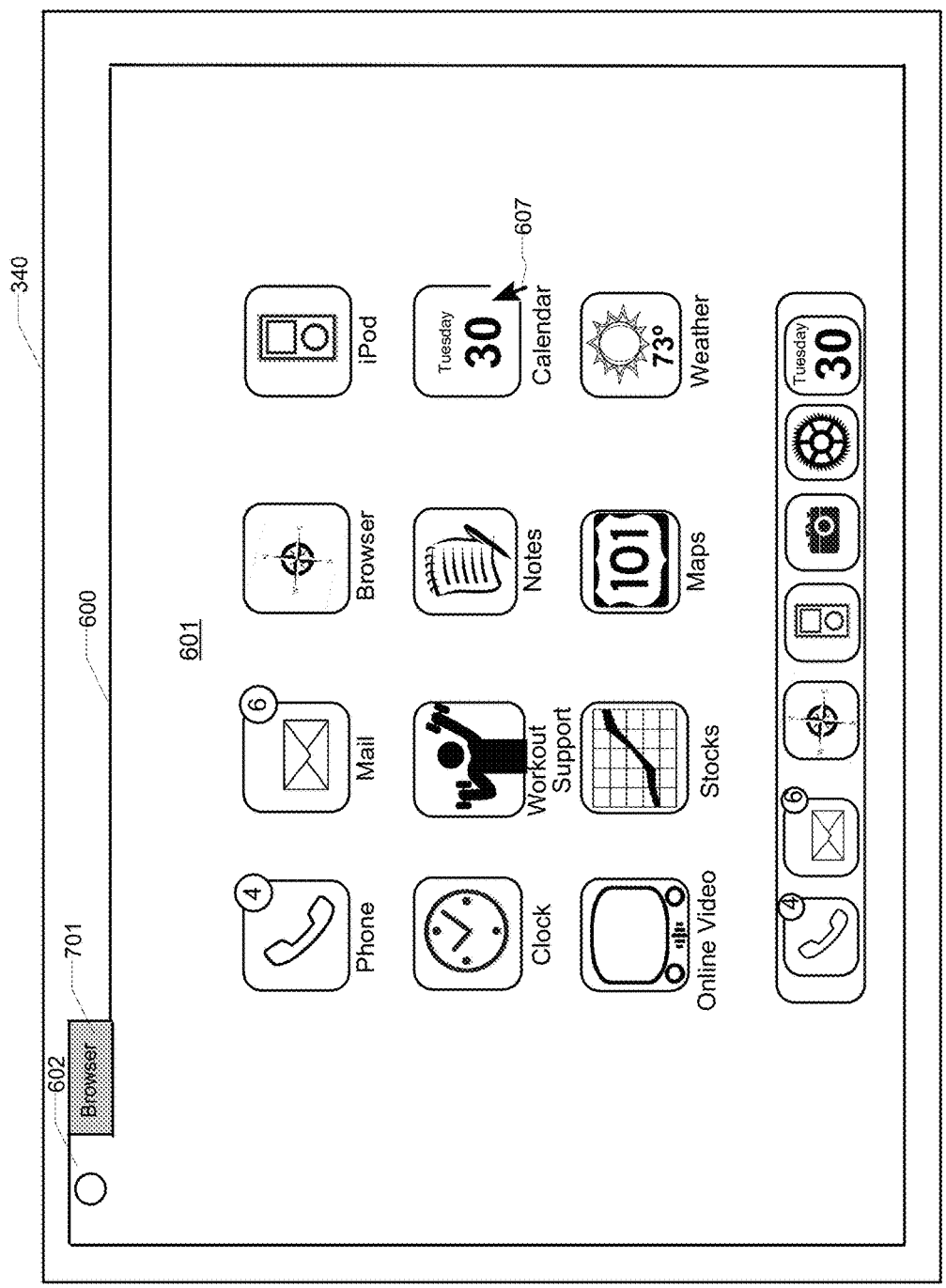
FIGS. 8A and 8B illustrate exemplary user interfaces for instantiating a virtual desktop user interface associated with a calendar application in accordance with some embodiments.

As mentioned previously, the device 300 instantiates a new virtual desktop in response to detecting a request to execute an application that does not already have an existing virtual desktop created for the application. For example, as shown in FIG. 8A the device 300 displays the virtual desktop 600 including the application launching user interface 601 in response to detecting the selection of the first tab control 602 shown in FIG. 7C. That is, the device 300 replaces the display of the virtual desktop 700 with the virtual desktop 600 including the application launching user interface 601 in response to detecting the selection of the first tab control 602.

Figure 8B:
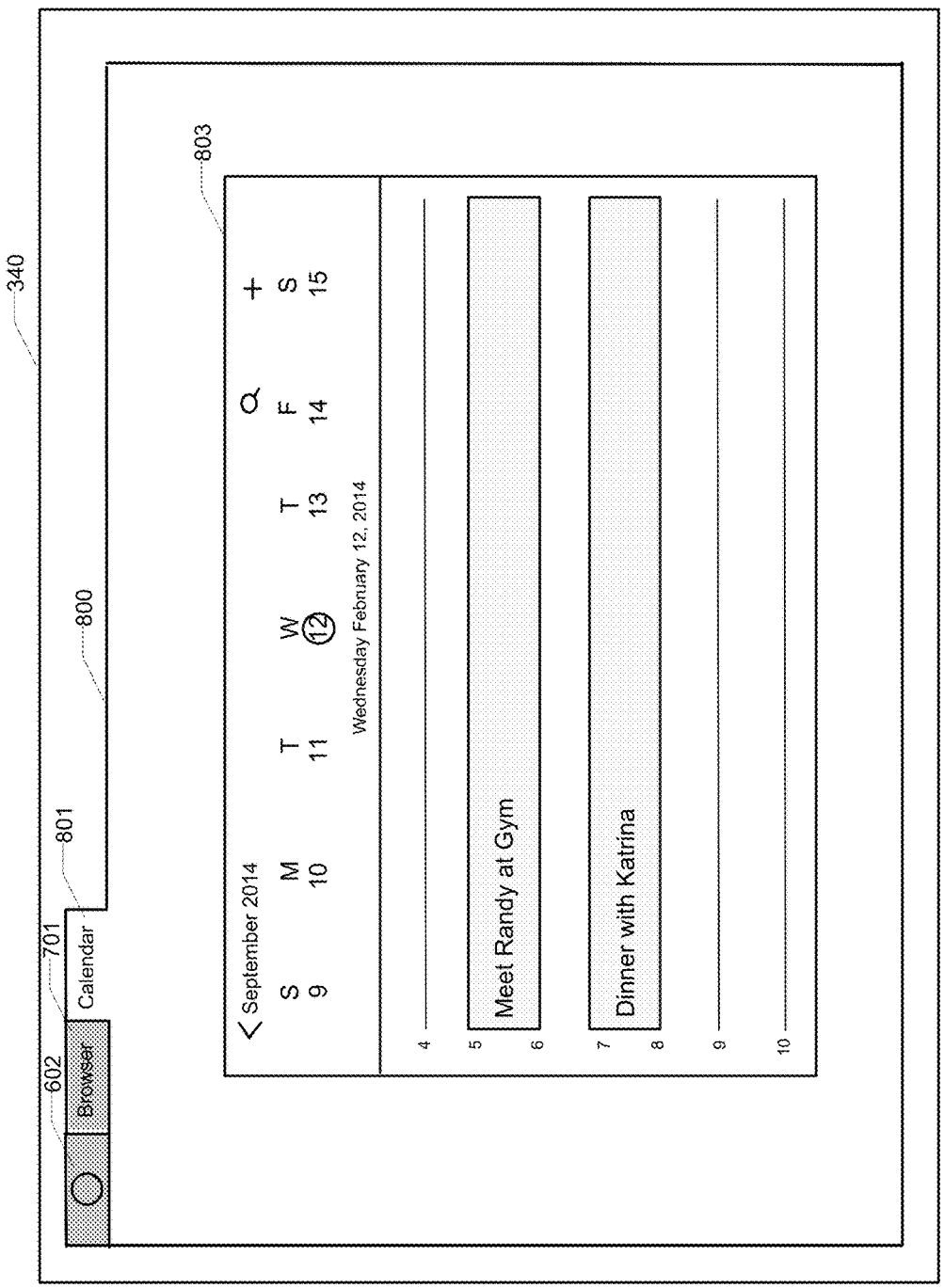

In FIG. 8A, the device 300 detects the selection of the calendar icon indicating a user request to activate the calendar application. In response to detecting the selection of the calendar icon, the device 300 determines that a virtual desktop for the calendar application does not exist and accordingly instantiates a new virtual desktop for the calendar application. Furthermore, the device 300 automatically dismisses the virtual desktop 600 for the application launching interface 601 upon instantiation of the virtual desktop for the calendar application. For example, FIG. 8B illustrates a virtual desktop 800 (e.g., a third virtual desktop) generated by the device 300 in accordance with some embodiments. The virtual desktop 800 includes a tab control 801 in the tab display region 503 and a user interface of a calendar application 803. The calendar application 803 is an example of an application window that is displayed in the virtual desktop 800.

As shown in FIG. 8B, the tab control 801 includes the label "calendar" to visually indicate that the virtual desktop 800 is associated with the calendar application. In some embodiments, responsive to a threshold number of tab controls (e.g., 12) being displayed in the tab display region 503, the device 300 modifies (e.g., decreases) the width of each tab control and displays a symbol representing the application of each tab control rather than a textual label. This allows the device 300 to display more tab controls within the tab display region 503.

In some embodiments, virtual desktops are combinable to create a merged virtual desktop. The application windows displayed within the merged virtual desktop are user interactable in the merged virtual desktop such that the functionality of each application is available to the user and the application windows can be positioned at different locations in merged virtual desktop. By combining multiple virtual desktops, the user can interact with different applications within a single virtual desktop according to the user's needs.

The device 300 combines two or more virtual desktops to create a merged virtual desktop in response to detecting an input that meets virtual desktop merge criteria that signifies a request to create a merged virtual desktop. In some embodiments, the virtual desktop merge criteria include detecting a selection of at least two virtual desktops (e.g., via the tab controls for the virtual desktops) followed by a key combination of control keys on the keyboard of the device 300 for merging virtual desktops. The virtual desktop merge criteria optionally include a gesture signifying a request to create a merged virtual desktop. The detection of the gesture signifying a request to merge two virtual desktops includes detecting a selection of a first tab control representative of a first virtual desktop and detecting movement (e.g., dragging and dropping) the first tab control on top of a second tab control that corresponds to a second virtual desktop.

In accordance with a determination that the input does not meet the virtual desktop merge criteria, the device 300 switches from displaying a first virtual desktop to displaying a second virtual desktop. For example, if an input to a tab control is determined by the device 300 to be a click or tap of a deactivated tab control of a virtual desktop, the device 300 displays the virtual desktop associated with the selected tab control. Thus, a first set of application windows displayed in the first virtual desktop are no longer visible when the device 300 switches from displaying the first virtual desktop to the second virtual desktop.

Figure 9A:
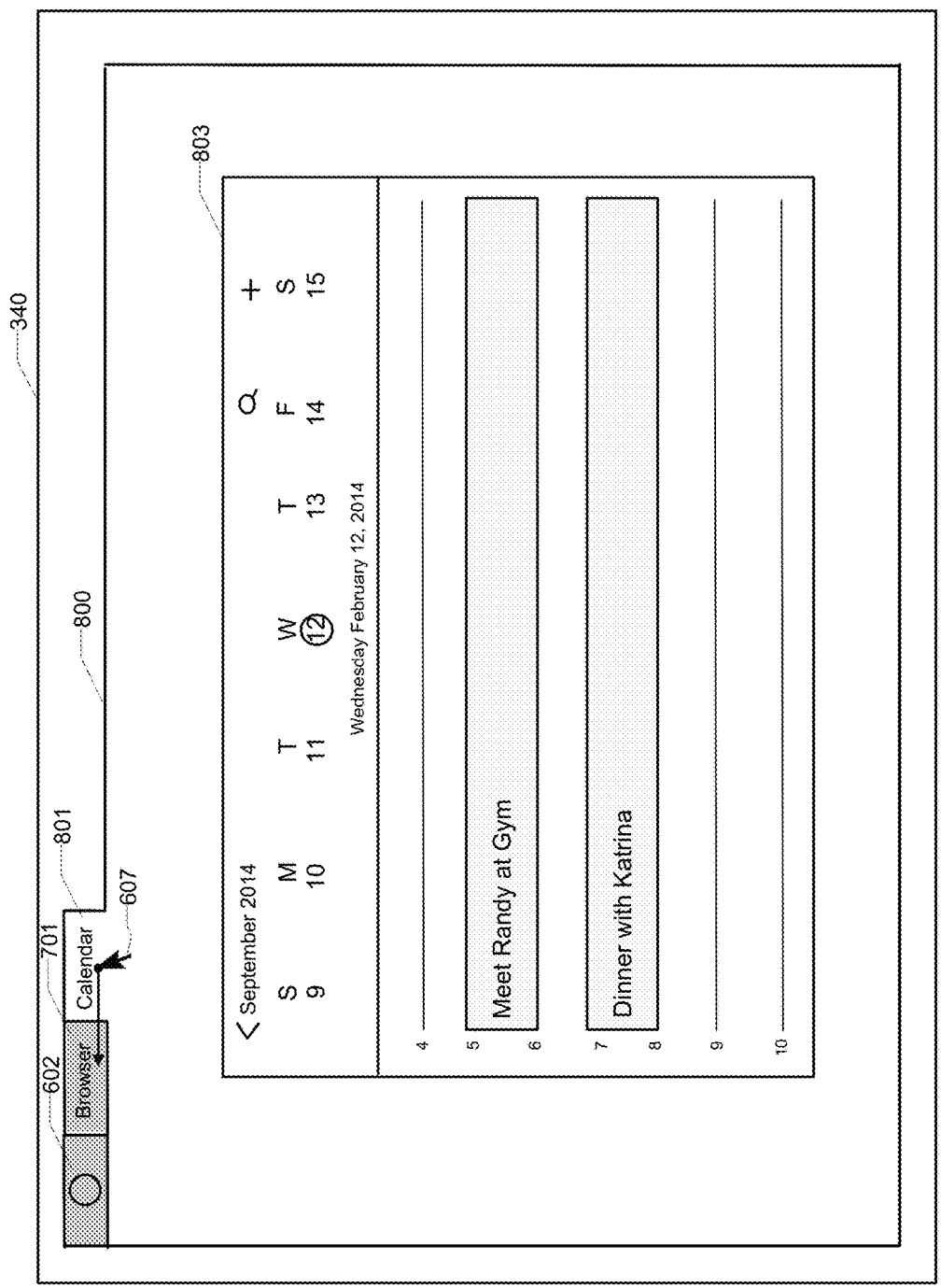
FIGS. 9A, 9B, 10A, and 10B illustrate a gesture for merging virtual desktop user interfaces in accordance with some embodiments.
Figure 9B:
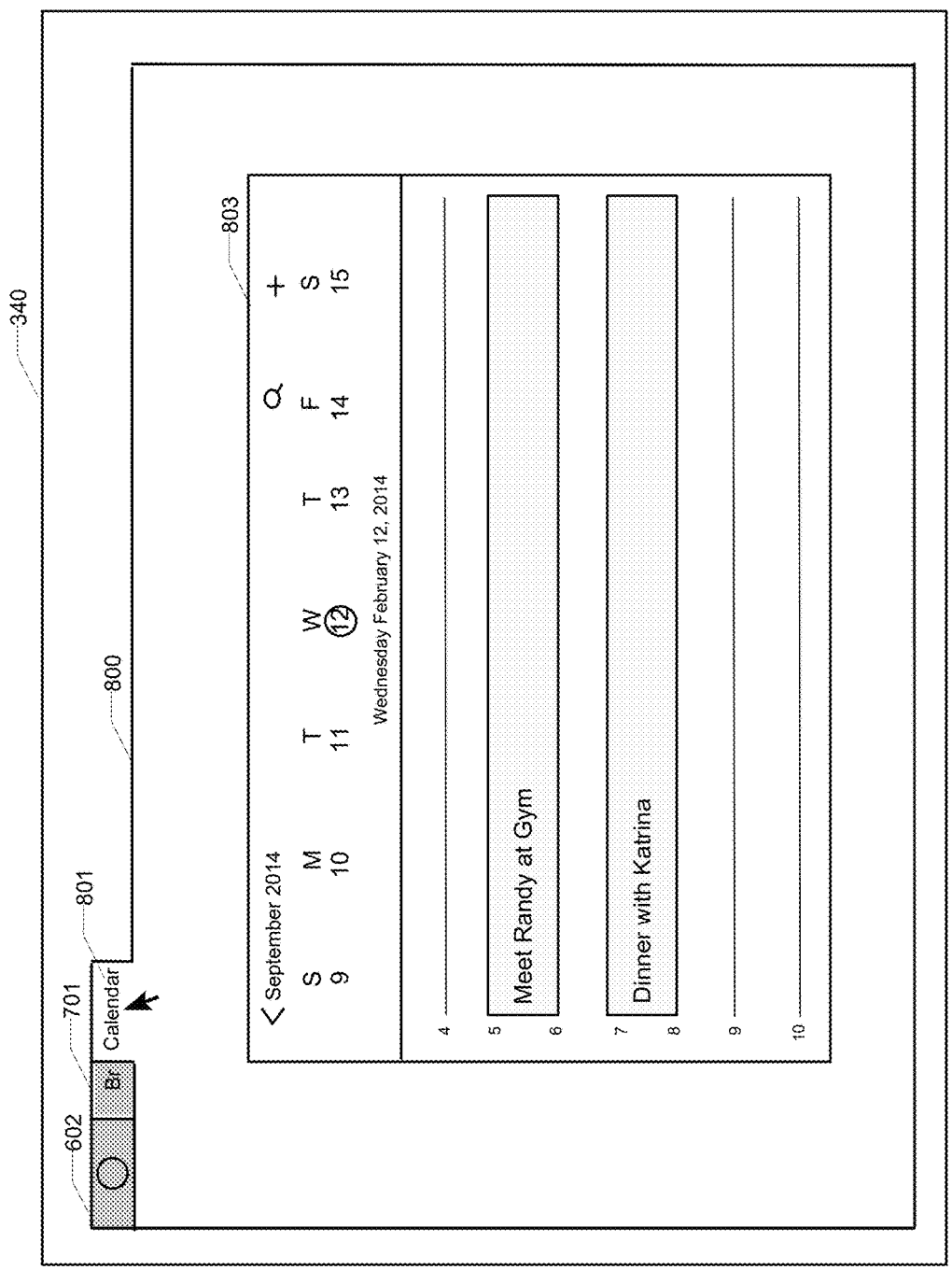

FIG. 9A illustrates a gesture signifying a request to create a merged virtual desktop in accordance with some embodiments. In FIG. 9A, the device 300 detects a selection of tab control 801 and an input dragging (e.g., moving) the tab control 801 in a direction (e.g., to the left) towards tab control 701. Upon the device 300 detecting that the tab control 801 covers a threshold amount (e.g., half) of tab control 701 as shown in FIG. 9B and is dropped onto tab control 701, the device 300 determines that a request to create a merged virtual desktop is received.

In response to detecting the request, the device 300 determines an arrangement of the application windows within virtual desktops requested to be combined. The arrangement describes the location of each application window within each virtual desktop. For example, the device 300 determines the arrangement (e.g., a location) of the calendar application 803 in virtual desktop 800 and determines the arrangement (e.g., a location) of the web browser window 703 and web browser window 705 in virtual desktop 700.

Furthermore, the device 300 determines the order in which to display the application windows in the merged virtual desktop. In some embodiments, the device 300 determines which application windows to display in front of the merged virtual desktop based on the order of the union of the tab controls. That is, the device 300 determines that an application window of a first virtual desktop whose associated tab control was dragged and dropped onto another tab control of a second virtual desktop is displayed in front of an application window of the second virtual desktop. Thus, the application window of the second virtual desktop is displayed in back of the application windows from the first virtual desktop. The device 300 then creates a merged virtual desktop including the application windows displayed in the determined order. If there are multiple application windows in one of the virtual desktops being merged, the device 300 interleaves the application windows while the virtual desktops are merged.

The device 300 creates the merged virtual desktop by overlaying either a first virtual desktop on top of a second virtual desktop or overlaying the second virtual desktop on top of the first virtual desktop. A first set of one or more open application windows from the first virtual desktop is displayed at a first location in the merged virtual desktop and a second set of one or more open application windows is displayed at a second location in the merged virtual desktop that correspond to the original arrangement of the application windows within the first virtual desktop and second virtual desktop. In some embodiments, the device 300 creates the merged virtual desktop by modifying one of the existing virtual desktops to include an application window (s) of another virtual desktop. For example, the device 300 creates a merged virtual desktop by modifying virtual desktop 700 to include the application window included in virtual desktop 800. Alternatively, the device 300 creates the merged virtual desktop by modifying virtual desktop 800 to include the application windows included in virtual desktop 700.

Figure 9C:
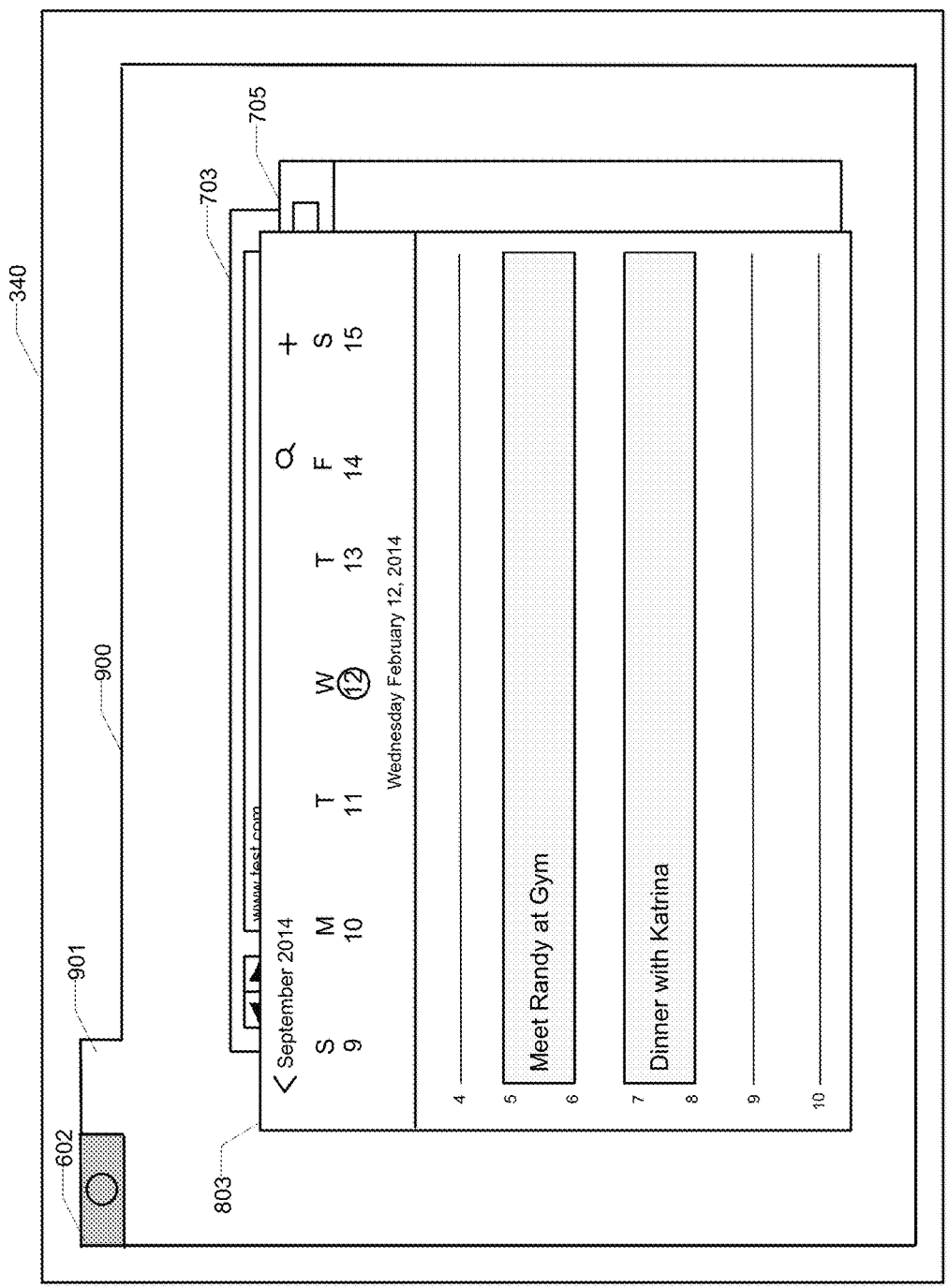
FIGS. 9C and 10C illustrate a merged virtual desktop user interface in accordance with some embodiments.

FIG. 9C is an exemplary user interface of a merged virtual desktop 900 in accordance with some embodiments. As shown in FIG. 9C, the merged virtual desktop is displayed to include the application windows from virtual desktop 800 and virtual desktop 700 while maintaining the arrangement of the application windows. That is, the merged virtual desktop includes the calendar application 803, the first web browser window 703, and the second web browser window 705 as displayed in their original location in their respective virtual desktops. Since the tab control 801 of the calendar application was dragged and dropped onto the tab control 701 of the web browser application, the calendar application 803 is displayed in front of the first web browser window 703 and the second web browser window 705 in the merged virtual desktop 900. Furthermore, the device 300 replaces the tab control 701 of the web browser application and the tab control 801 of the calendar application with a tab control 901 representing the merged virtual desktop 900 in the tab display region 503. By replacing tab control 701 and tab control 801 with the tab control 901, tab controls 701, 801 are no longer displayed on device 300. In some embodiments, if the user does not interact with any of the applications in a merged virtual desktop within a threshold amount of time, the device 300 automatically splits the merged virtual desktop into separate virtual desktops that each includes its respective application. For example, if the device 100 detects that an interaction with the calendar application 803, the first web browser window 703, or second web browser window 705 displayed in the merged virtual desktop 900 is not received within a threshold amount of time, the device 300 automatically splits the merged virtual desktop 901 into the virtual desktop 700 including the first web browser window 703 and the second web browser window and into the virtual desktop 800 including the calendar application 803.

While FIGS. 9A-9C show virtual desktop 700 being merged with virtual desktop 800 in response to a drag input from tab control 801 onto tab control 701, in some embodiments virtual desktop 700 is merged with virtual desktop in response to a drag input from tab control 701 onto tab control 801, or in response to a pinch gesture that includes detecting a first contact at a location that corresponds to tab control 701 and a second contact at a location to that corresponds to tab control 801 and subsequent movement of the contacts toward each other.

Figure 9D:
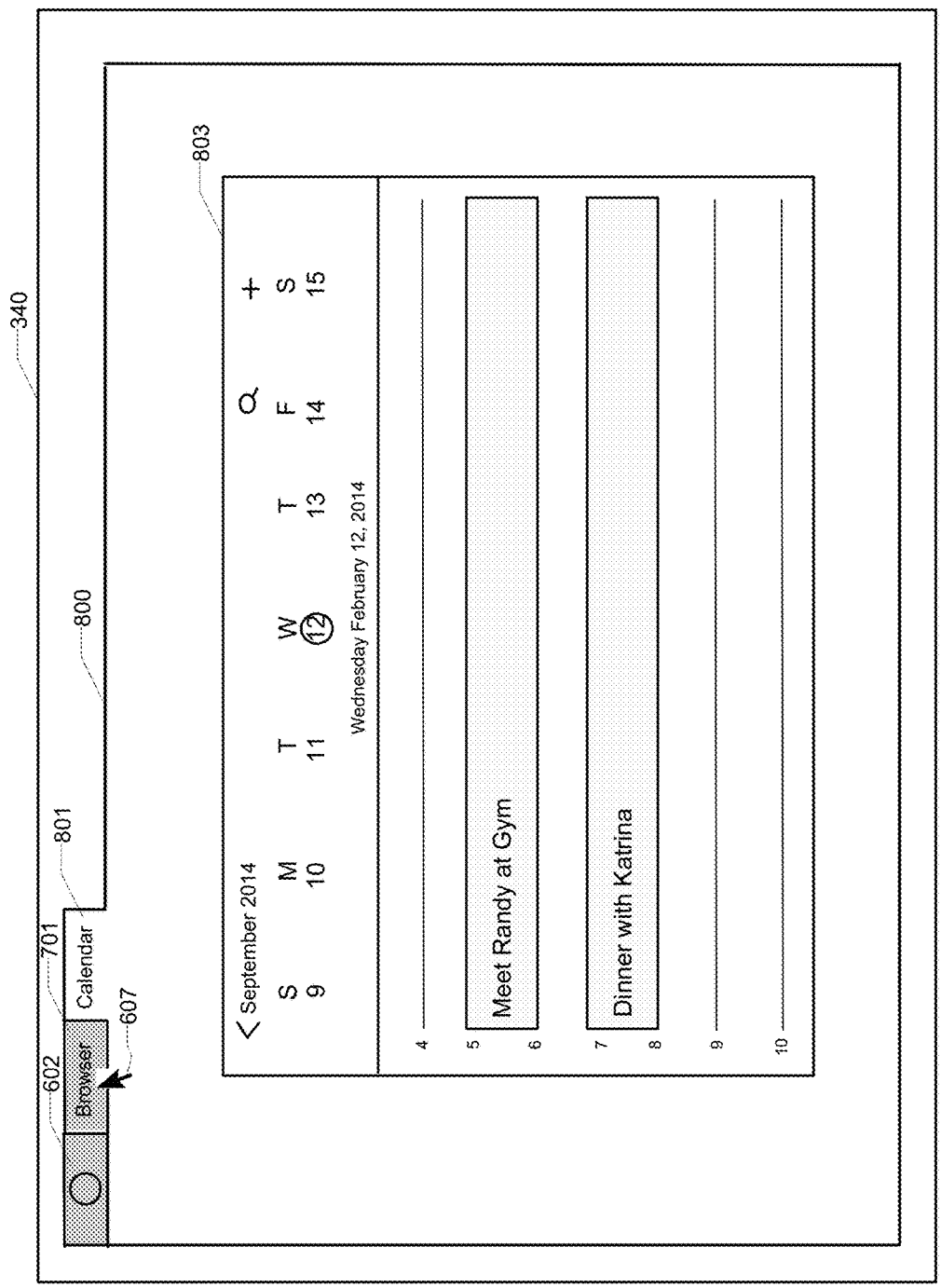
FIGS. 9D and 9E illustrate an input for navigating between virtual desktops in accordance with some embodiments.
Figure 9E:
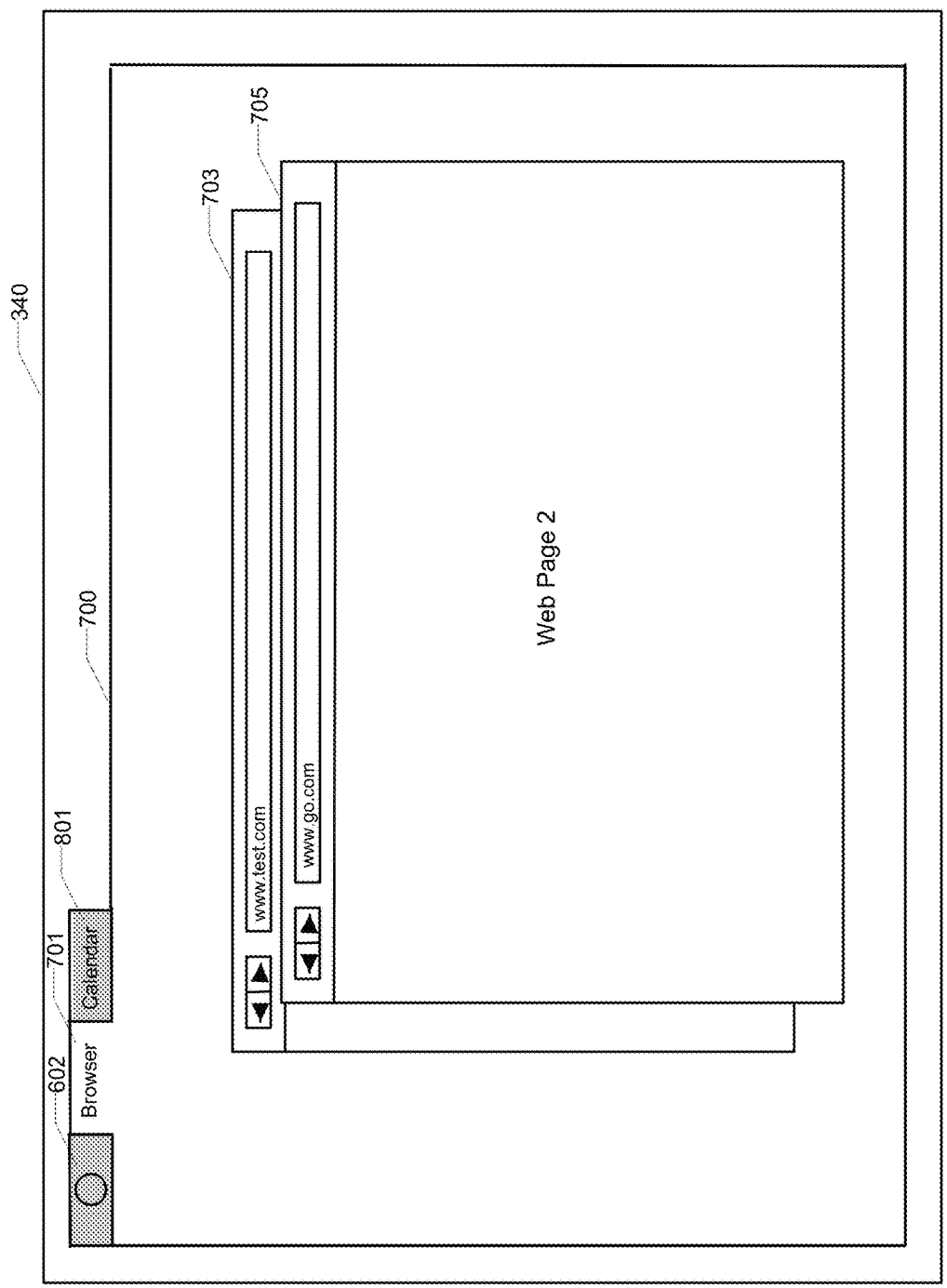

In some embodiments, in response to detecting a tap gesture or a click input corresponding to tab control 701, the device 300 switches from displaying virtual desktop 800 to displaying virtual desktop 700, as shown in FIGS. 9D-9E.

Figure 10A:
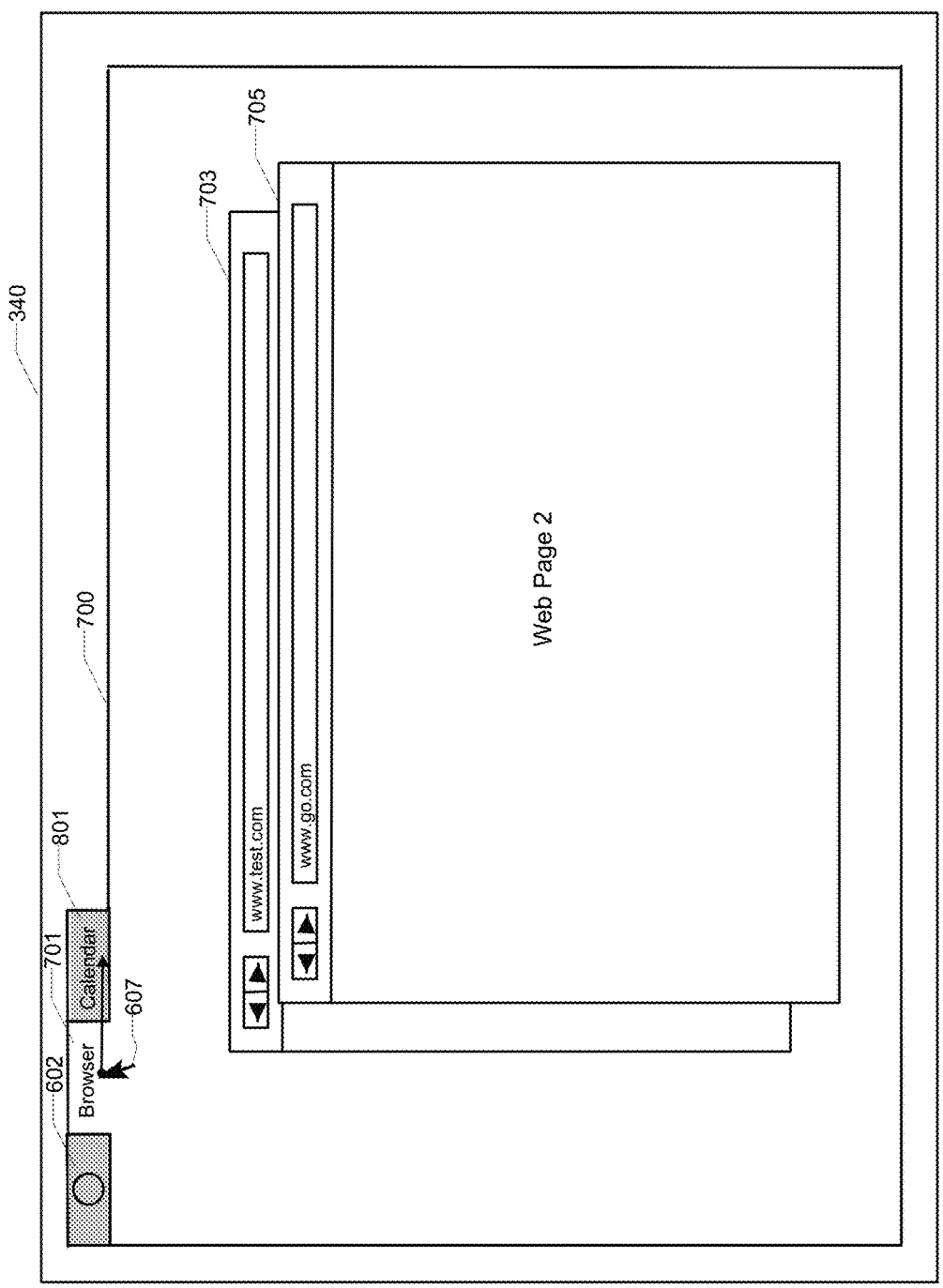
Figure 10B:
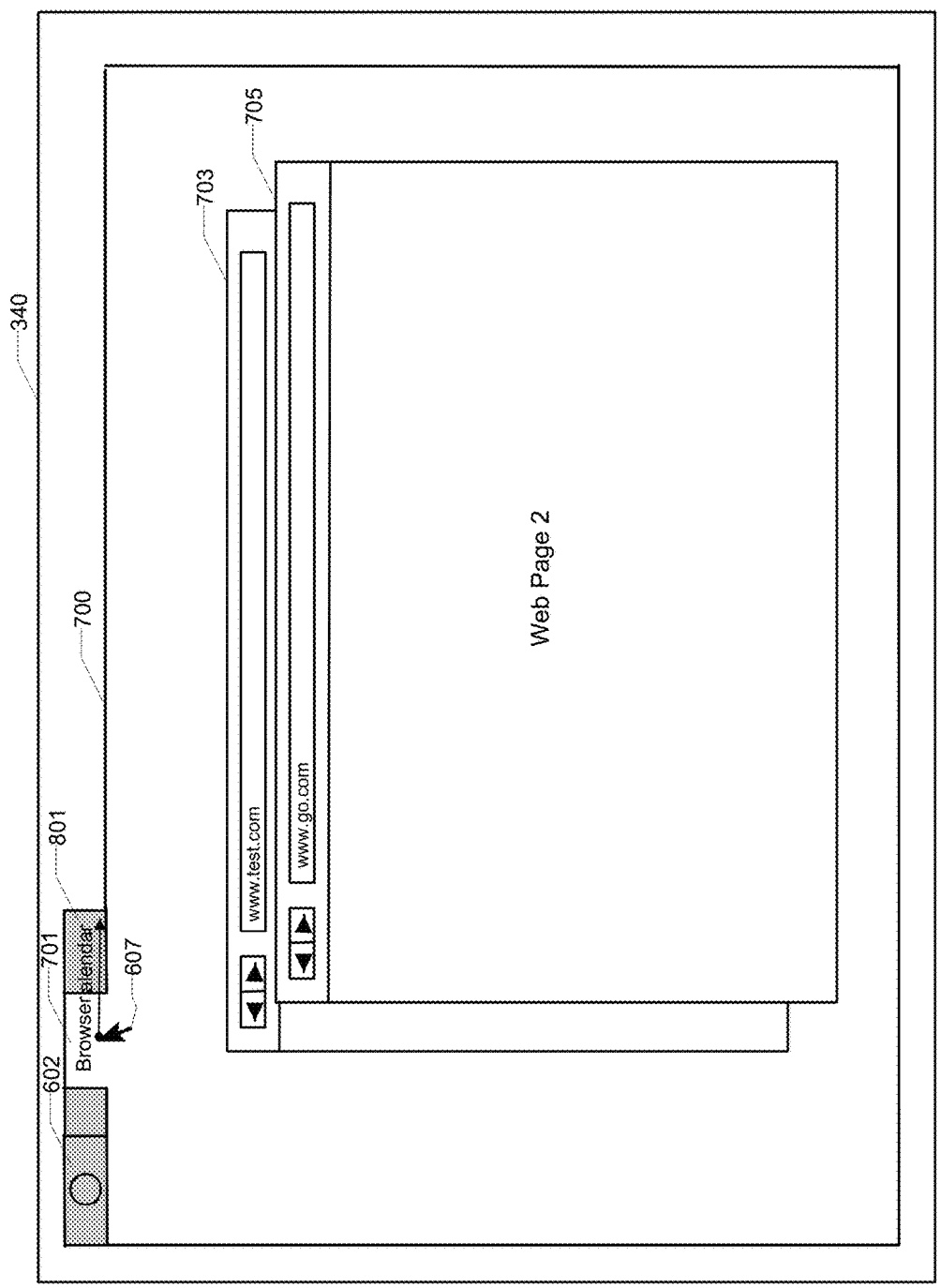

FIG. 10A illustrates a gesture signifying a request to create a merged virtual desktop by dragging and dropping the tab control 701 for the web browser application onto the tab control 801 for the calendar application in accordance with some embodiments. In FIG. 10A, the device 300 detects a selection of tab control 701 and an input dragging (e.g., moving) the tab control 701 in a direction (e.g., to the right) towards tab control 801. Upon the device 300 detecting that the tab control 701 covers a threshold amount (e.g., half) of tab control 801 as shown in FIG. 10B and is dropped onto tab control 801, the device 300 determines that a request to create a merged virtual desktop is received.

Similar to the discussion above, the device 300 determines which application windows to display in the front of the merged virtual desktop based on the order of the union of the tab controls. In the example shown in FIG. 10A, the device 300 determines that the application windows included in virtual desktop 700 should be displayed in front of the application window from virtual desktop 800 since the tab control 701 was dragged over tab control 801.

Figure 10C:
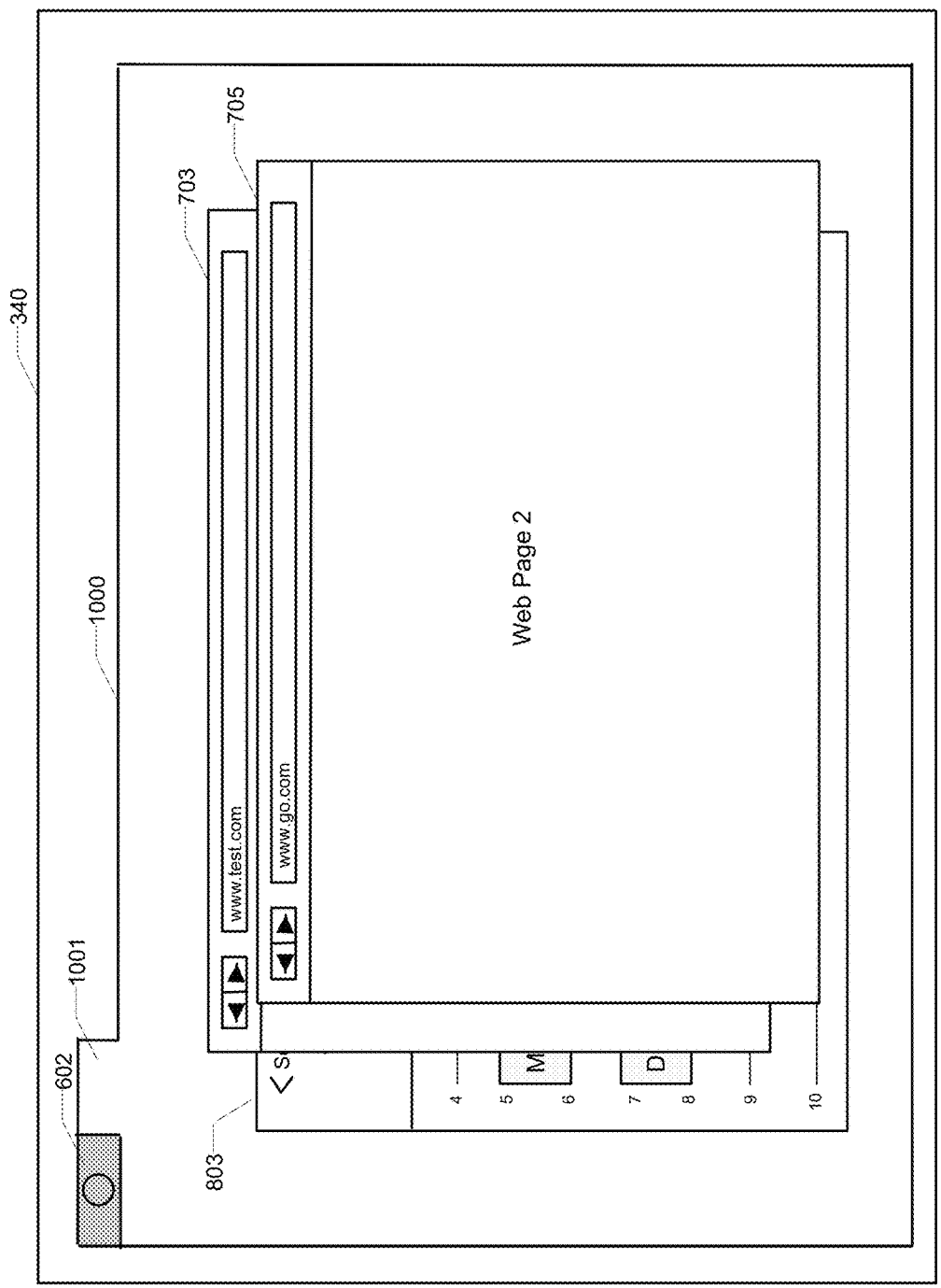

FIG. 10C is an exemplary user interface of a merged virtual desktop 1000 in accordance with some embodiments. The merged virtual desktop 1000 is similar to the merged virtual desktop shown in FIG. 9C. As shown in FIG. 10C, the merged virtual desktop 1000 includes the calendar application 803, the first web browser window 703, and the second web browser window 705 while maintaining the arrangement of the application windows. However, since the tab control 701 of the web browser application was dragged and dropped onto the tab control 708 of the calendar application, the first web browser window 703 and the second web browser window 705 are displayed in front of the calendar application 803 in the merged virtual desktop 1000. Furthermore, the device 300 replaces the tab control 701 of the web browser application and the tab control 801 of the calendar application with a tab control 1001 representing the merged virtual desktop 1000.

As mentioned previously, the application windows are interactable within a merged virtual desktop. In some embodiments, any modifications to an application window in the merged virtual desktop are maintained when the merged virtual desktop is separated (e.g., split) back out into multiple virtual desktops (e.g., a first virtual desktop and a second virtual desktop). Modifications include any changes to the location of an application window, preference settings, or content displayed in the application window.

Figure 11A:
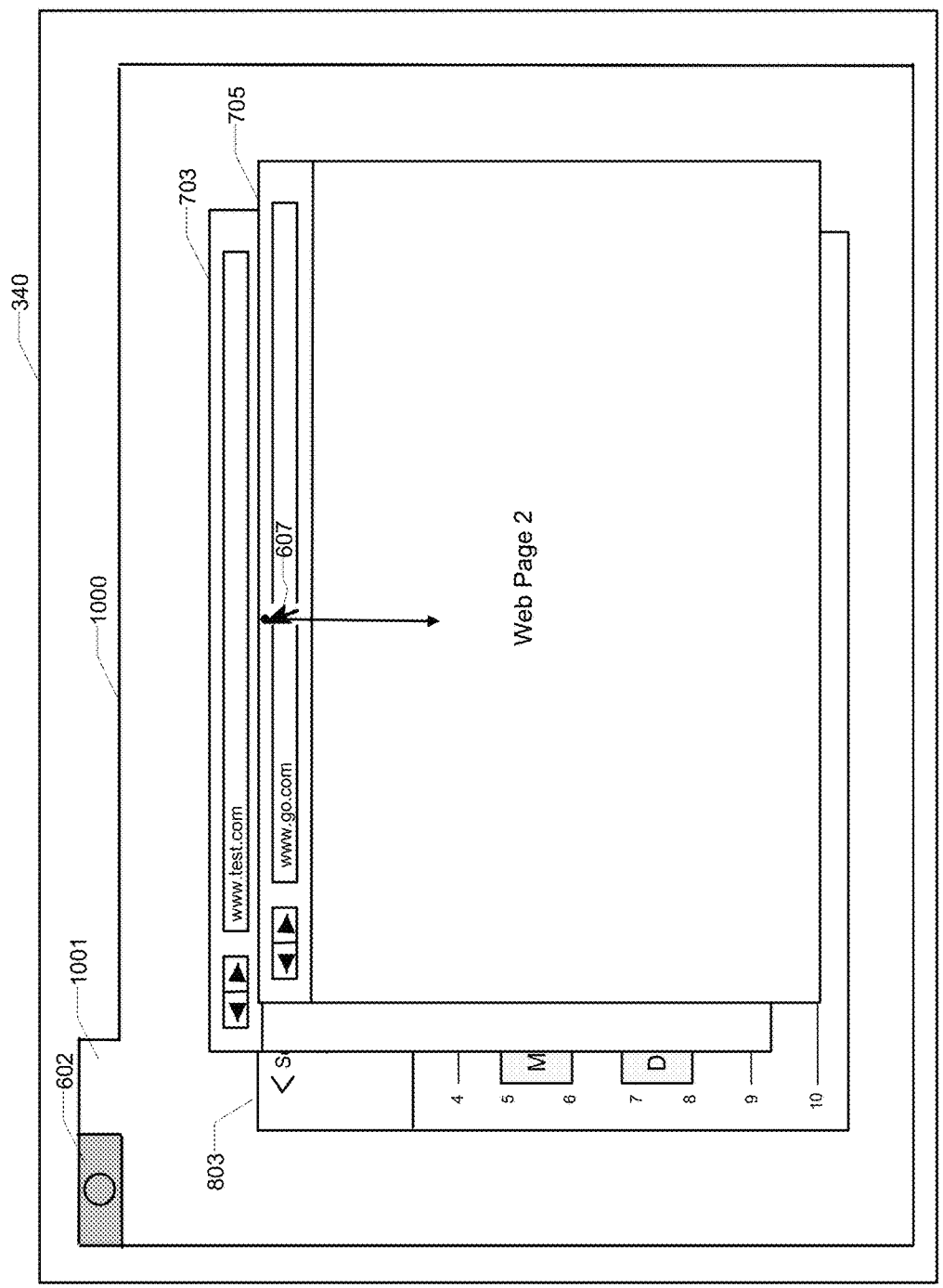
FIG. 11A illustrates a gesture for moving an application window within the merged virtual desktop user interface in accordance with some embodiments.
Figure 11B:
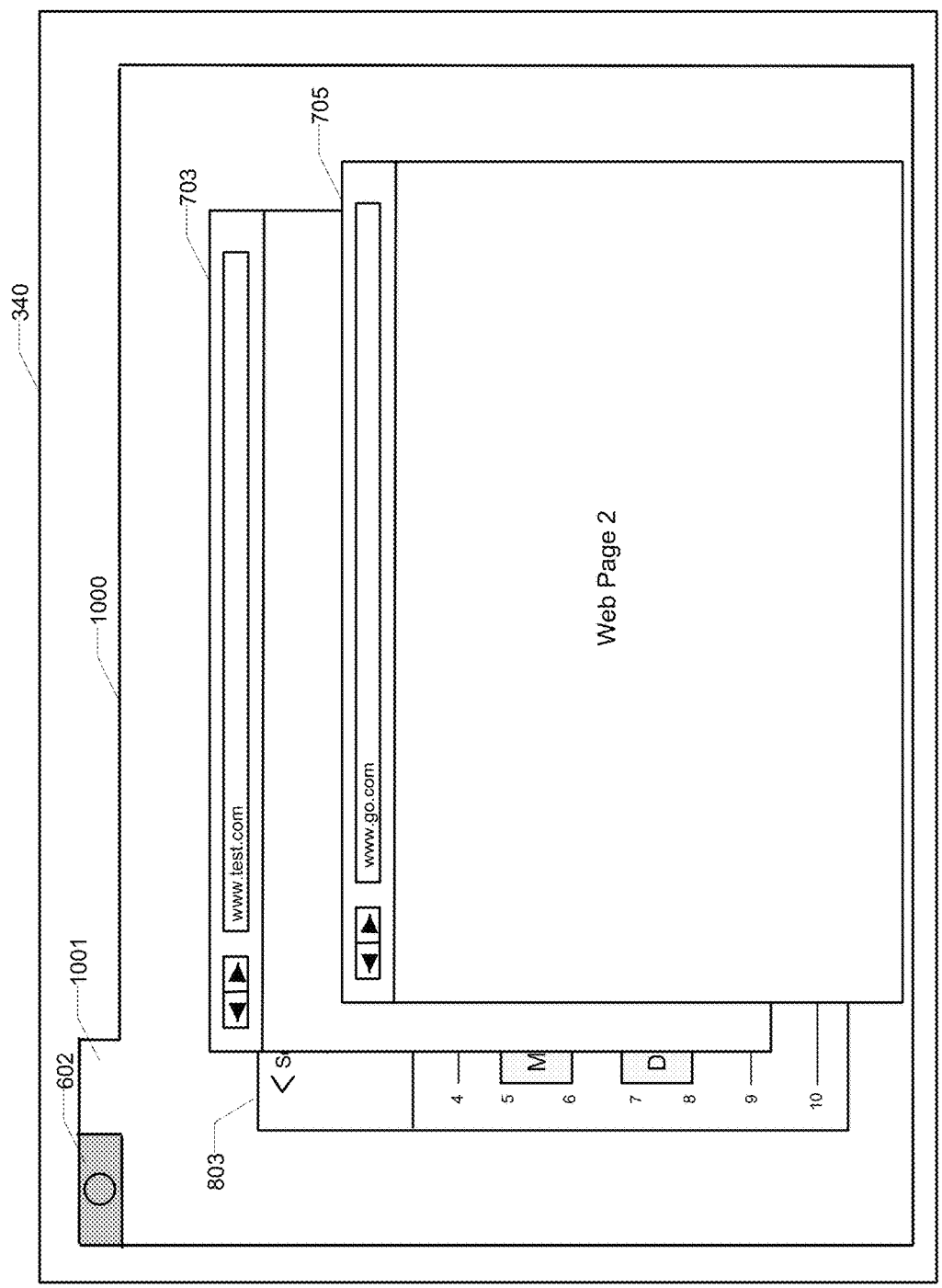
FIG. 11B illustrates the application window moved to a new location within the merged virtual desktop user interface in accordance with some embodiments.

FIG. 11A illustrates a gesture in the merged virtual desktop 1000 moving web browser window 705 to a different location in the merged virtual desktop 1000 in accordance with some embodiments. The web browser window 705 is initially displayed at a first location in the merged virtual desktop 1000. The device 300 detects a selection of the web browser window 705 while at the first location and movement (e.g., downward) of the web browser window 705 to a second location as shown in FIG. 11B.

In some embodiments, merging of virtual desktops is temporary. The device 300 separates a merged virtual desktop back into multiple virtual desktops that were used to create the merged virtual desktop in response to detecting a request to separate the merged virtual desktop. The request to separate a merged virtual desktop includes a combination of keyboard keys or a gesture. For example, the device detects depinch gesture that includes detecting movement of two or more fingers away from each other on a touch-sensitive surface while the tab control is selected (e.g., while a cursor is over the tab or when the contacts are detected on the tab on a touch-sensitive display). In response to the device 300 detecting an input requesting to separate the merged virtual desktop back to multiple virtual desktops, the device 300 dismisses the merged virtual desktop and instantiates the virtual desktops included the merged virtual desktop and their corresponding tab controls as shown in FIG. 11C.

Figure 11C:
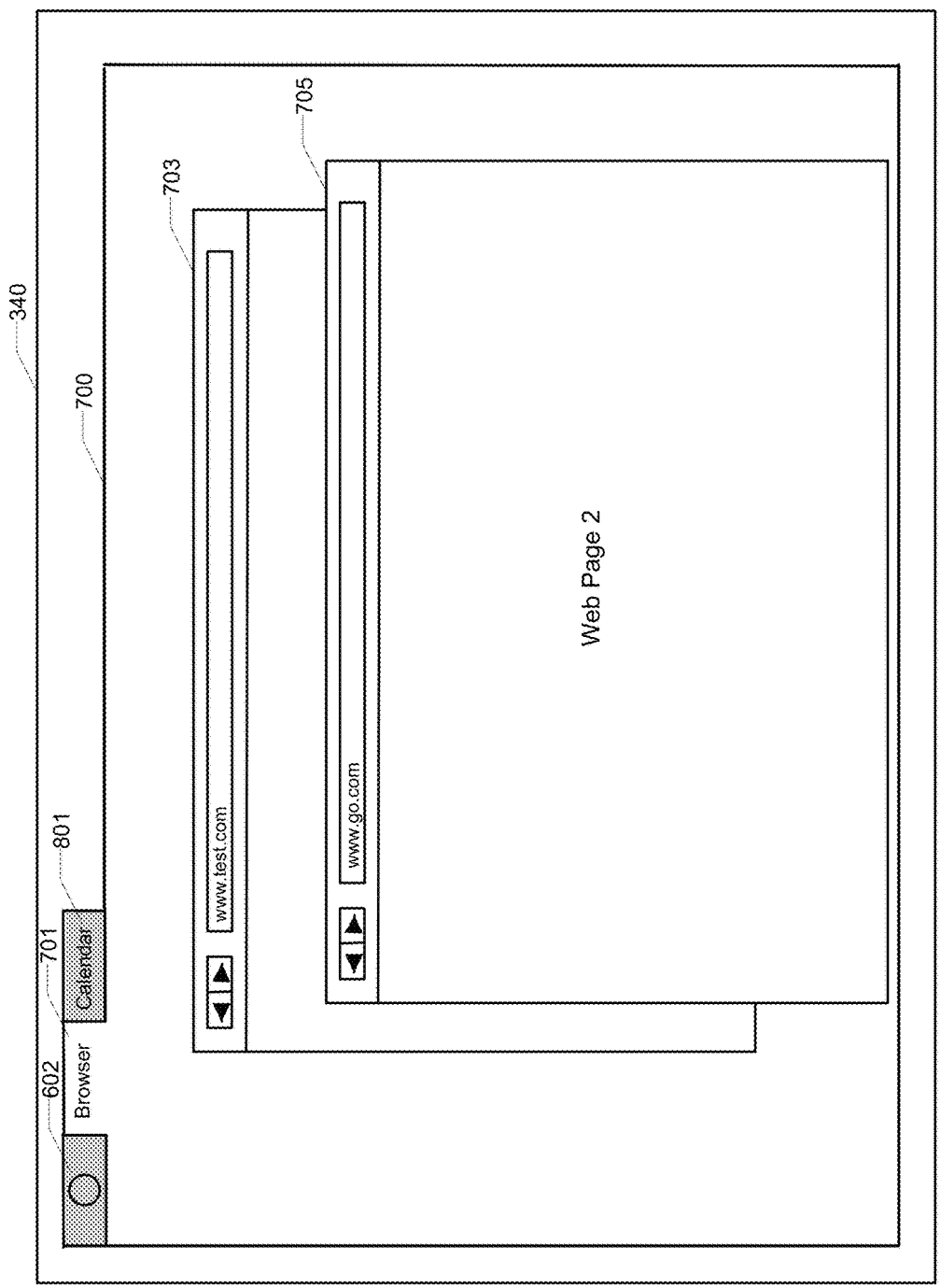
FIG. 11C illustrates virtual desktop user interfaces that are split apart in accordance with some embodiments.

FIG. 11C illustrates the virtual desktop 700 for the web browser application and its associated tab control 701 and virtual desktop 800 for the calendar application and its associated tab control 602. The merged virtual desktop 1000 is thus replaced with virtual desktop 700 and virtual desktop 800. As mentioned previously, any modifications to the application windows in the merged virtual desktop are maintained in the separate virtual desktops. Thus, the movement of web browser window 705 to the second location in the merged virtual desktop 1000 is maintained in the virtual desktop 700 shown in FIG. 11C. That is, the web browser window 705 is displayed at the second location within virtual desktop 700.

Figure 12A:
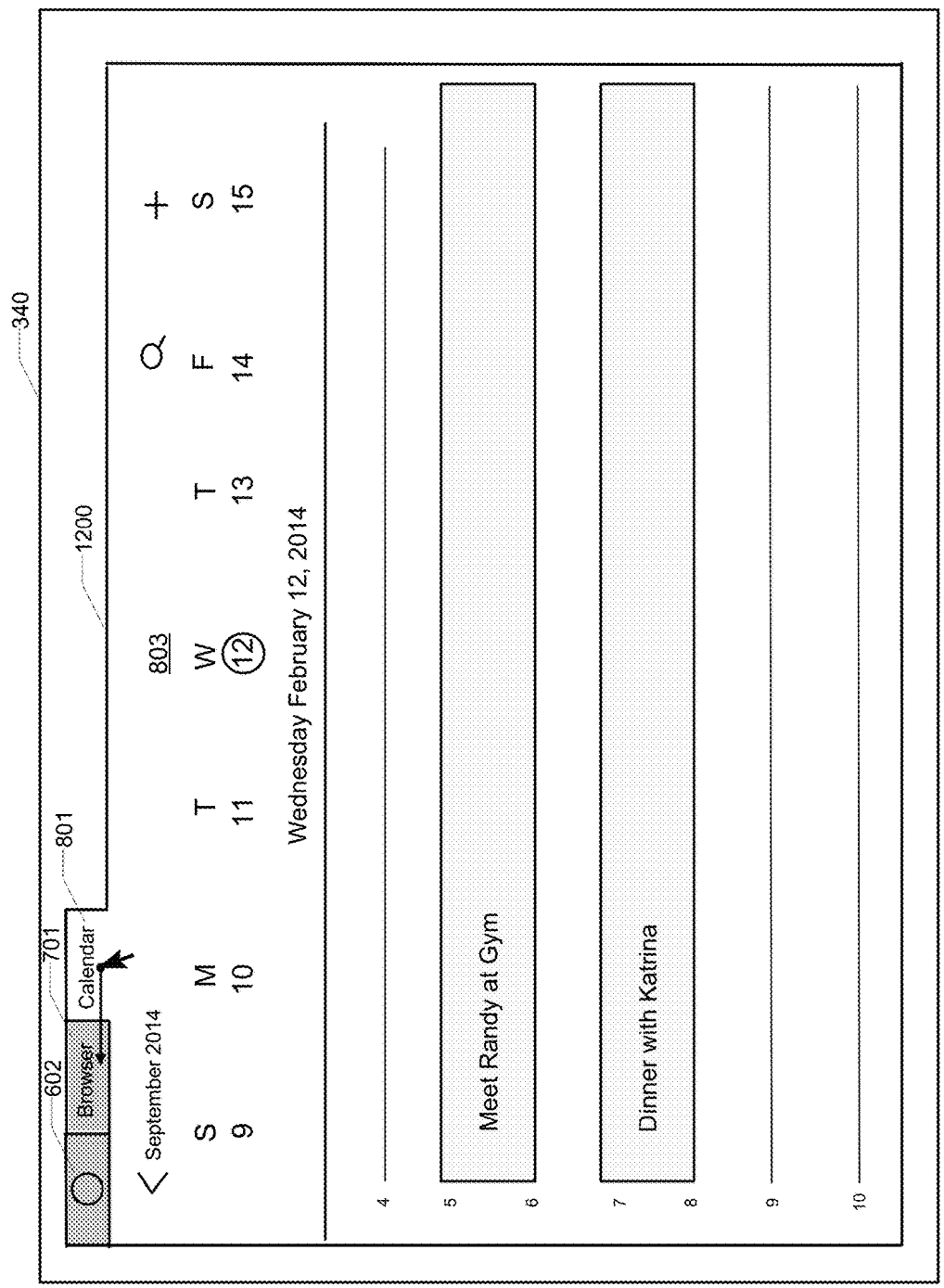
FIGS. 12A and 12B illustrate a gesture for merging virtual desktop user interfaces of applications displayed in a full screen mode in accordance with some embodiments.

In some embodiments, an application window is displayed in a full screen mode within a virtual desktop. FIG. 12A illustrates a virtual desktop 1200 generated by the device 300 in accordance with some embodiments. The virtual desktop 1200 is similar to virtual desktop 800 described above in that virtual desktop 1200 includes a tab control 801 that is a representation of the the virtual desktop 1200 and the calendar application 803. However, in contrast to virtual desktop 800, virtual desktop 1200 includes the calendar application 803 displayed in the full screen mode.

Figure 12B:
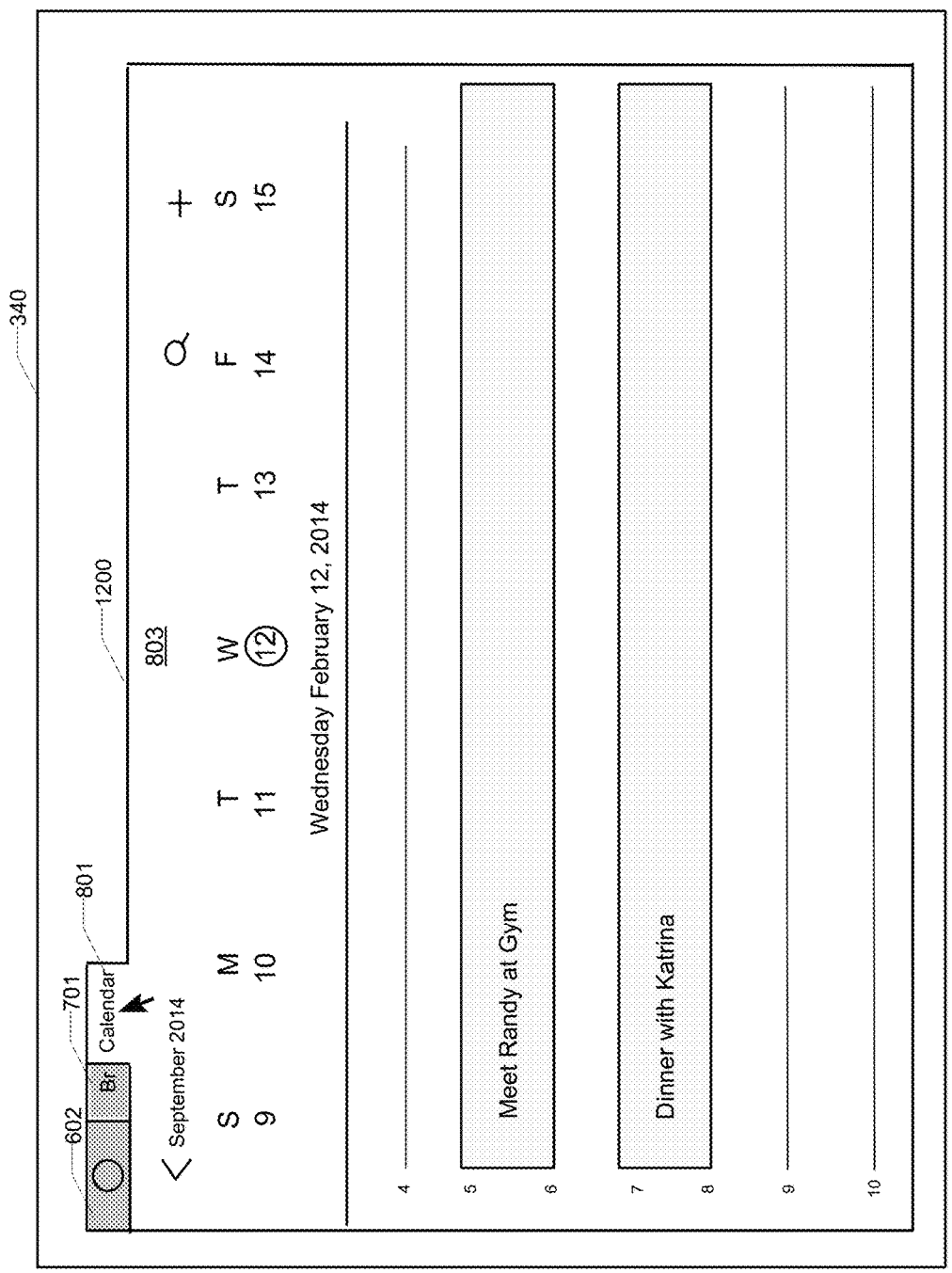

FIGS. 12A and 12B illustrate an input of a gesture dragging and dropping the tab control 801 onto the tab control 701 signifying a request to create a merged virtual tab based on virtual desktops 800 and 700. In some embodiments, in response to detecting an input to merge multiple virtual desktops, the device 300 determines whether at least one of the application windows included in the multiple virtual desktops is displayed in the full screen mode. If the device 300 determines that one of the application windows is displayed in the full screen mode, rather than displaying a first application window in the front of the merged virtual desktop and a second application window in back of the first application window as previously described above, the device 300 displays a split screen view of the application windows.

Figure 12C:
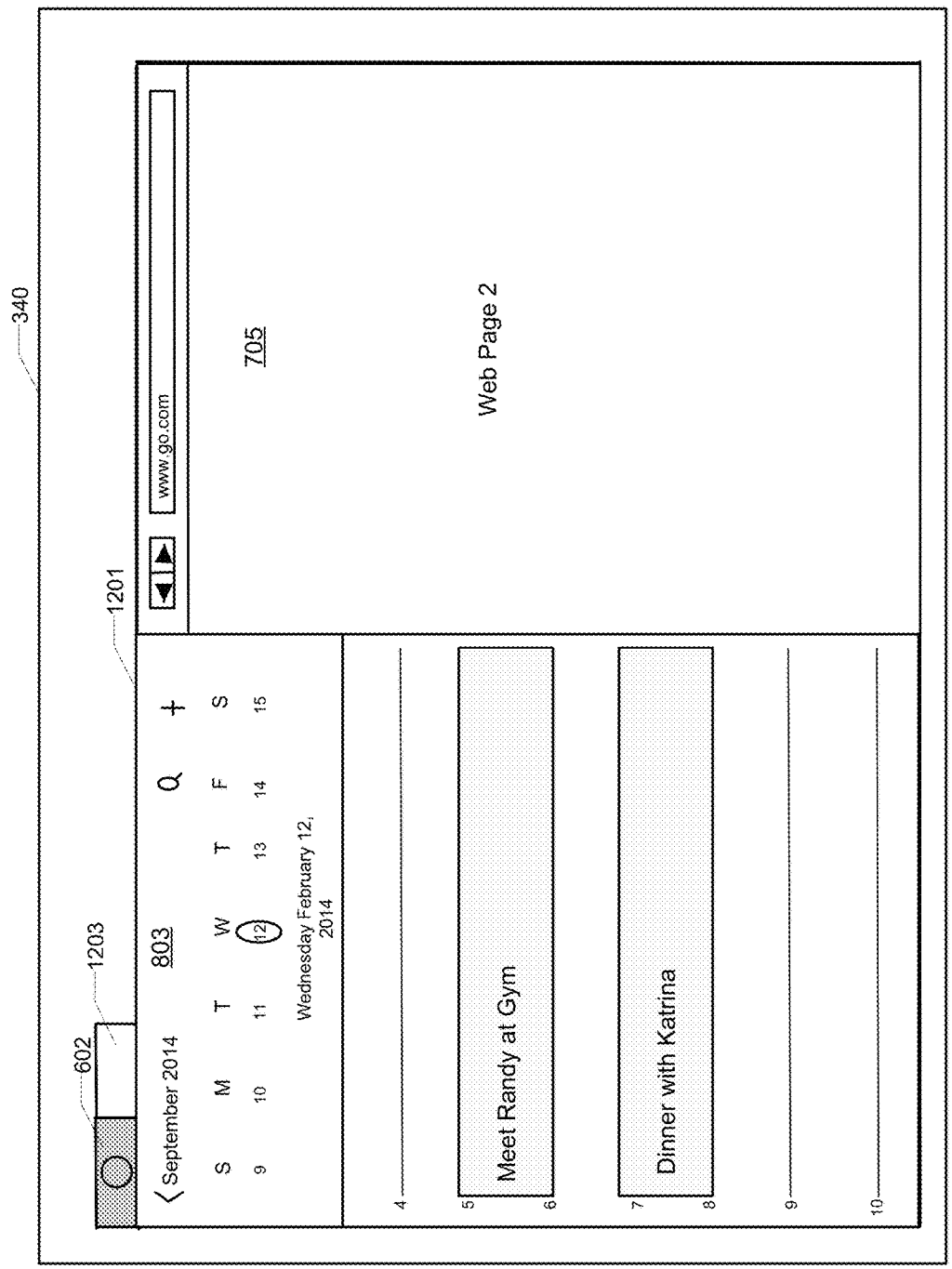
FIG. 12C illustrates a merged virtual desktop user interface of applications displayed in a full screen mode in accordance with some embodiments.

FIG. 12C is a user interface of split screen view of a merged virtual desktop 1201 in accordance with some embodiments. As shown in FIG. 12C, the device 300 displays the calendar application 803 in a first portion of the merged virtual desktop 1201 and displays the web browser window 705 in a second portion of the merged virtual desktop 1201 that is adjacent to the first portion. Although the first portion and second portion are horizontally adjacent to one another, the device 300 optionally displays the first portion and the second portion vertically adjacent to one another.

In some embodiments, the device 300 divides the width of the virtual desktop into multiple portions and displays the application windows from the virtual desktops being merged in a full screen mode in a corresponding portion of the merged virtual desktop 1201. For example, as shown in FIG. 12C, the calendar application 803 takes up half the width of the display 340 and the web browser window 705 takes up a remaining half of the display. If multiple application windows are included in a virtual desktop that will be merged, the device 300 determines the application window displayed in the foreground of the virtual desktop and displays the determined application window in the merged virtual desktop. For example, the device 300 determines that web browser window 705 is displayed in the foreground of virtual desktop 700 and accordingly displays the web browser window 705 in the full screen mode in merged virtual desktop 1201.

In some embodiments, the device 300 displays icons that represent minimized application windows along an edge of a virtual desktop. The icons representing minimized application windows optionally persist across different virtual desktops so that icons for minimized windows in different virtual desktops are displayed in a single virtual desktop. Alternatively, the device 300 only displays icons representing minimized windows within a virtual desktop along the edge of only that particular virtual desktop.

Figure 13:
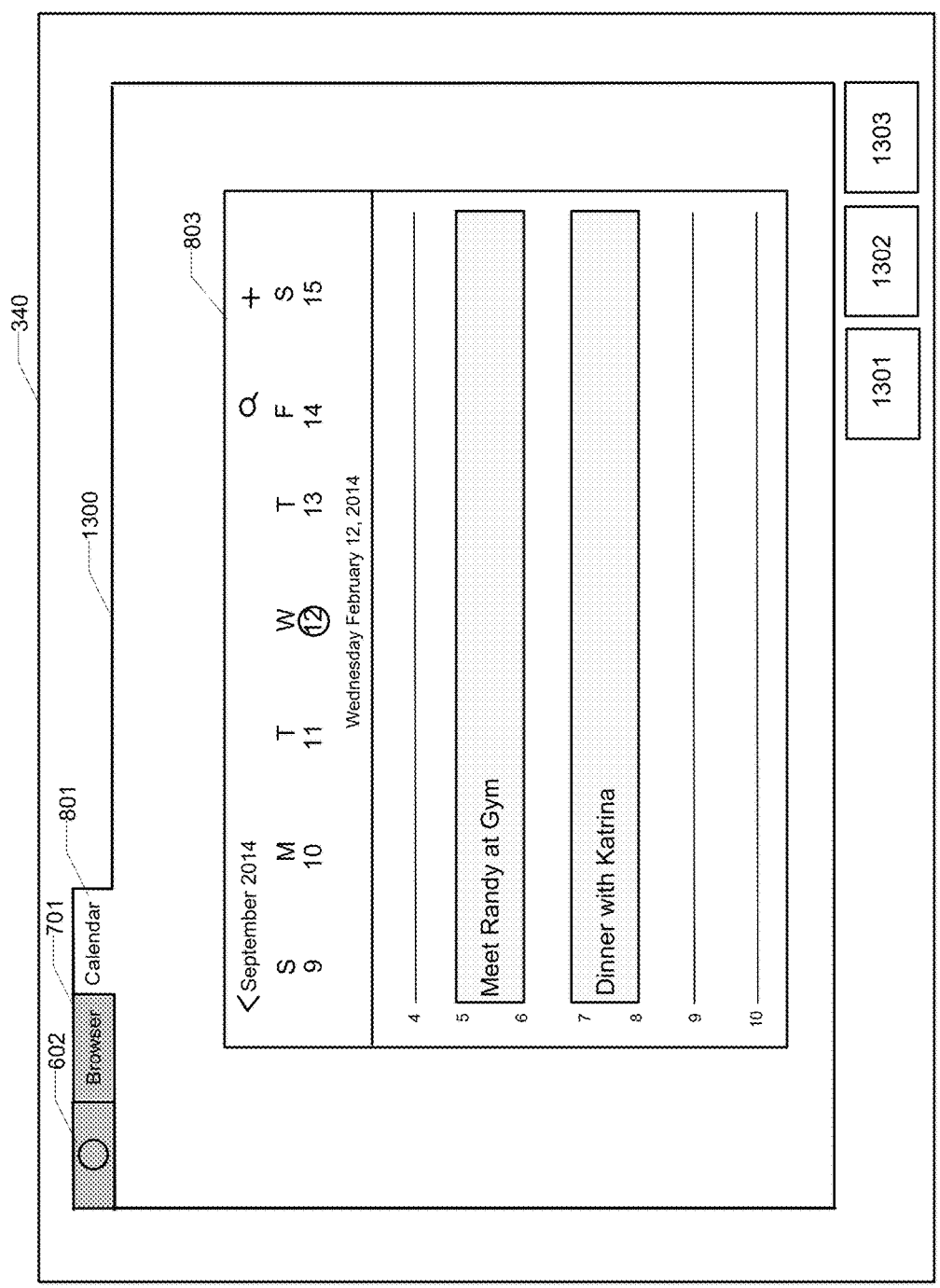
FIG. 13 illustrates exemplary representations of minimized windows in accordance with some embodiments.

FIG. 13 illustrates an exemplary user interface for virtual desktop 1300 for the web browser application in accordance with some embodiments. The virtual desktop 1300 includes icons 1301, 1302, and 1303. Icons 1301, 1302, and 1303 represent minimized application windows. The icons optionally represent application windows that are minimized in virtual desktop 1300. Thus, if the virtual desktop associated with tab control 701 is displayed, icons 1301, 1302, and 1303 are not displayed since the icons are associated with the minimized windows within virtual desktop 1300. In some embodiments, icons 1301, 1302, and 1303 represent the minimized application windows across different virtual desktops and thus are persistently displayed regardless of which virtual desktop is displayed on device 300. In some embodiments, icons 1301, 1302, and 1303 are displayed within virtual desktop 1300 without regard to whether or not they are associated with virtual desktop 1300 (e.g., icons corresponding to minimized windows in a first virtual desktop are displayed in a second desktop when the second desktop is displayed on the display, and selection of one of those icons would cause the window to be displayed in the first virtual desktop).

As shown in the Figures, the virtual desktops and application windows lack any menus that display commands for the virtual desktops and applications (e.g., to make room for the tab bar which is displayed along a top edge of the virtual desktops). In some embodiments, a menu of an application is only displayed upon user request. The device 300 detects a request to display a menu of an application by detecting a selection of a tab control of a virtual desktop while the virtual desktop is already displayed on device 300. That is, while the tab control of a virtual desktop is already displayed in an active state, the device 300 detects a selection of the tab control. In response to detecting the selection of the tab control while already displayed in the activate state, the device 300 displays a menu of the application associated with the virtual desktop. In response to detecting the selection of a tab control that is displayed in the deactivated state, the device 300 displays the virtual desktop associated with the tab control and the tab control is displayed in the activate state.

Figure 14:
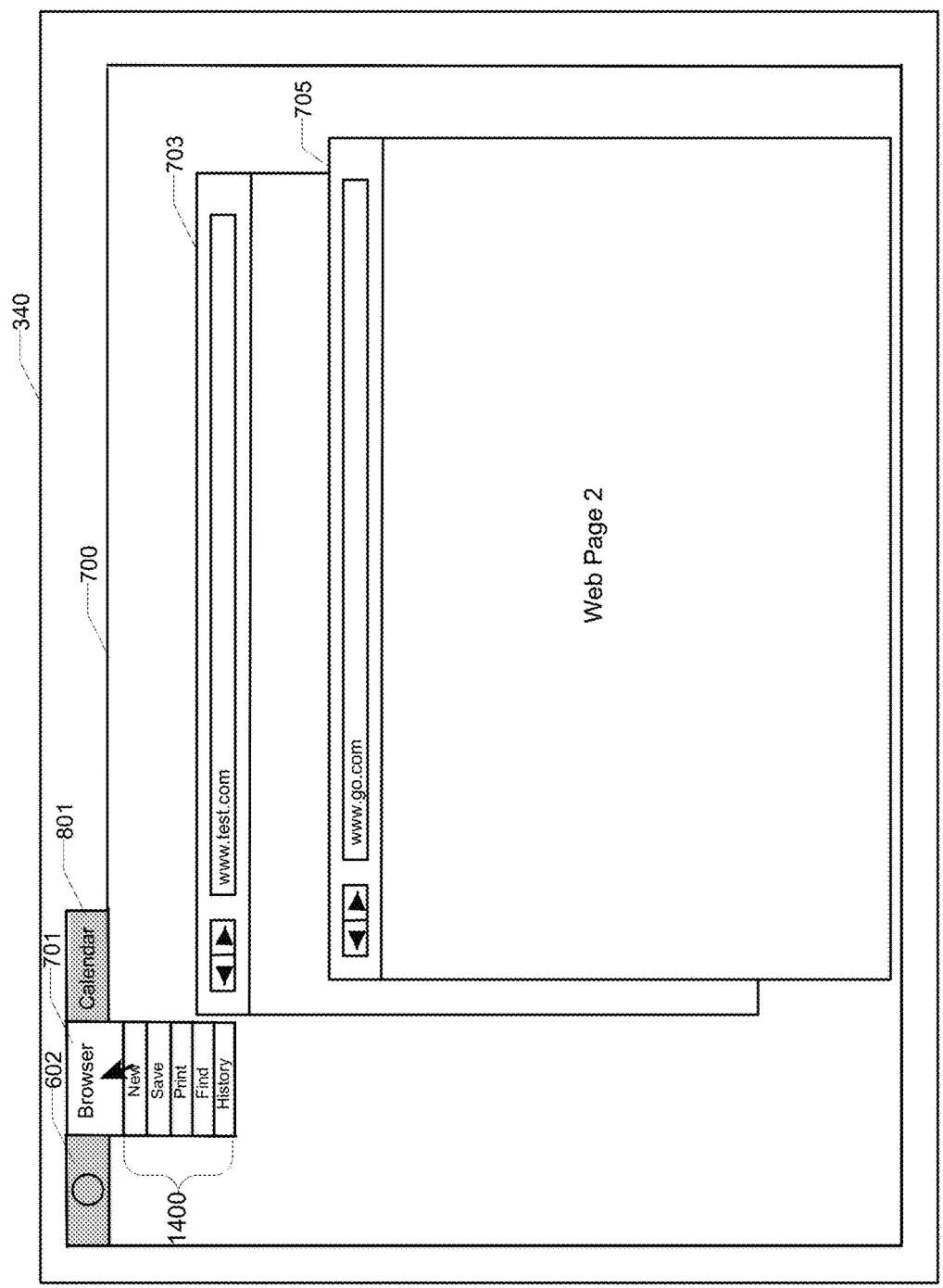
FIG. 14 illustrates an exemplary menu user interface of the browser application in accordance with some embodiments.

FIG. 14 illustrates an exemplary menu 1400 of the web browser application in accordance with some embodiments. To display the menu 1400, the device detects the selection of the tab control 701 while the tab control 701 is in an active state (e.g., while the tab control 701 is displayed). In response to detecting the selection, the device 300 displays the menu 1400 for the web browser application. The menu includes menu options such as an option to create a new browser window, an option to save a web page, an option to print a web page, an option to find text within a web page, and an option to view the web browsing history. Other menu options are displayed in some embodiments. In another example, the device 300 detecting selection of the representation (e.g., tab control 602) of the application launching user interface 601 while the application launching user interface 601 is displayed causes the display of system menu items (e.g., information about the device 300, software updates, an application store, dock, recent items, sleep restart, shut down, log off, etc.). By displaying the menu of an application only upon user request, the user interface of device 300 is further de-cluttered providing a streamlined appearance. In some embodiments the menu items in the menu include sub-menus (e.g., the menu items correspond to menus for the application corresponding to the virtual desktop such as a file menu, an edit menu, a view menu, an insert menu, a format menu, a font menu, and a tools menu). If the tab control of a virtual desktop is not displayed, selection of the tab control causes the device 300 to display the virtual desktop.

Figure 15:
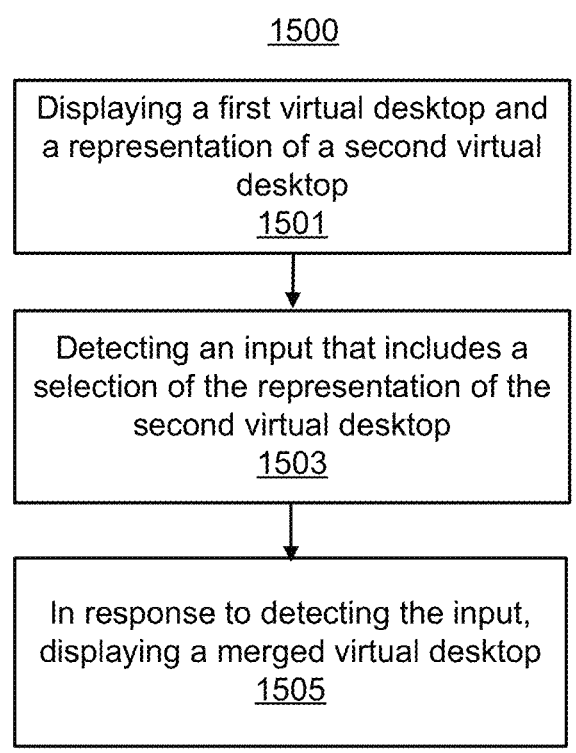
FIG. 15 is a method flow diagram for merging virtual desktop user interfaces in accordance with some embodiments.

FIG. 15 is an exemplary method flow diagram of a method 1500 for displaying an ergonomic mode of an application. Note that in some embodiments, different steps may be performed other than those shown in FIG. 15.

The device 300 concurrently displays 1501 a first virtual desktop that includes a first set of one or more open application windows and displays a representation of a second virtual desktop that includes a second set of one or more open application windows (e.g., as described above with reference to FIG. 8B, where a calendar virtual desktop 800 is displayed along with a representation of a browser virtual desktop 701). While concurrently displaying the first virtual desktop and the representation of the second virtual desktop, the device 300 detects 1503 an input that includes a selection of the representation of the second virtual desktop (e.g., as described above with reference to FIG. 9A-9B, where the device detects a drag input dragging the representation 801 of calendar desktop onto the representation 701 of browser virtual desktop). In response to detecting the input, in accordance with a determination that the input meets virtual desktop merge criteria, the device 300 displays 1505 a merged virtual desktop (e.g., shown in FIG. 9C, where the browser virtual desktop has been merged with the calendar virtual desktop). The merged virtual desktop includes the first set of application windows and the second set of application windows (e.g., one or more windows of the web browser and one or more windows of the calendar). In some embodiments, the device 300 merges a representation of the first virtual desktop with the representation of the second virtual desktop in accordance with a determination that the input meets the virtual desktop merge criteria.

In accordance with a determination that the input does not meet the virtual desktop merge criteria, the device 300 switches from displaying the first virtual desktop including the first set of application windows to displaying the second virtual desktop including the second set of application windows (e.g., as shown in FIGS. 9D-9E, wherein an input is received on tab control 701 in FIG. 9D resulting in the display of virtual desktop 700 in FIG. 9E). While the device 300 displays the second virtual desktop, the device 300 displays a representation of the first virtual desktop.

In some embodiments, the representation of the first virtual desktop includes a first tab control (e.g., shown in FIG. 8B, where virtual desktop 800 includes tab control 801), the representation of the second virtual desktop includes a second tab control (e.g., shown in FIG. 8B, where virtual desktop 700 includes tab control 701), and the merged virtual desktop is associated with a representation of the merged virtual desktop that includes a third tab control (e.g., shown in FIG. 9C, where merged virtual desktop 900 includes tab control 901). The first tab control associated with the first virtual desktop, the second tab control associated with the second virtual desktop, and the third tab control associated with the merged virtual desktop optionally are displayed in a tab display region by the device 300. In some embodiments, the first tab control and the second tab control are each associated with an application.

In some embodiments, detecting the input comprises detecting a selection of the second tab control and detecting movement of the selected tab control onto the first tab control signifying a request to merge the first virtual desktop and the second virtual desktop (e.g., shown in FIGS. 9A-9C, where virtual desktop 800 includes tab control 801 being dragged and dropped onto tab control 701 and in FIGS. 10-10C, where virtual desktop 700 includes tab control 701 being dragged and dropped onto tab control 801).

In some embodiments, while displaying the first virtual desktop, the device 300 displays a representation of an application launching interface (e.g., shown in FIG. 7A, where tab control 602 is displayed that represents the application launching interface). The device 300 detects a selection of the representation of the application launching interface. In response to detecting selection of the representation of the application launching interface, the device 300 replaces display of the first virtual desktop with the application launching interface (e.g., shown in FIGS. 7A-7B, where tab control 602 is selected in FIG. 7A and in response to the selection virtual desktop 600 is displayed which represents the application launching interface). The application launching interface optionally includes a plurality of icons associated with corresponding applications. In some embodiments, the plurality of icons are displayed across a plurality of pages displayed within the application launching interface.

In some embodiments, the device 300 detects an input selecting a first icon from the plurality of icons displayed within the application launching interface (e.g., shown in FIG. 7B, where the browser icon is selected). In accordance with detecting the input selecting the first icon, the device 300 inactivates the representation of the application launching interface to no longer display the application launching interface including the plurality of icons on the display (e.g., shown in FIG. 7C, where the virtual desktop 600 is no longer displayed). In some embodiments, the representation of the application launching interface is a fourth tab control. The device 300 instantiates the first virtual desktop that includes a first application associated with the selected first icon (e.g., shown in FIG. 7C, where the web browser window 705 is instantiated). The device 300 creates the first tab control representing the first virtual desktop. The device 300 concurrently displays the fourth tab control in an inactive state and the first tab control in an active state.

In some embodiments, the device 300 displays an application launch user interface object for launching a third application in a respective user interface that does not include a third virtual desktop for the third application (e.g., shown in FIG. 8A, where tab control 602 is displayed that represents the application launching interface). The device 300 detects activation of the application launch user interface object. In response to detecting activation of the application launch user interface object, in accordance with a determination that there is a preexisting third virtual desktop for the third application, the device 300 replaces display of the respective user interface with the preexisting third virtual desktop (e.g., shown in FIG. 7C). In accordance with a determination that there is not a preexisting third virtual desktop for the third application, the device 300 replaces display of the respective user interface with a new third virtual desktop for the third application (e.g., shown in FIG. 8B, where virtual desktop 800 is displayed for the calendar application 803).

In some embodiments, the first set of one or more application windows are displayed in a first arrangement in the first virtual desktop (e.g., shown in FIG. 7C, where web browser windows 703, 705 are displayed in a first arrangement) and the second set of one or more application windows are displayed in a second arrangement in the second virtual desktop (e.g., shown in FIG. 8B, where the calendar application 803 is displayed in a second arrangement). Displaying the merged virtual desktop comprises combining the first set of one or more application windows with the second set of one or more application windows while maintaining the first arrangement and the second arrangement (e.g., shown in FIG. 9C, where web browser windows 703, 705 are displayed in the first arrangement and the calendar application 803 is displayed in the second arrangement).

In some embodiments, at least one of a first application window from the first set of one or more application windows and a second application window from the second set of one or more application windows is displayed in a full screen mode (e.g., shown in FIG. 12A, where calendar application is displayed in the full screen mode). Displaying the merged virtual desktop comprises in some embodiments the device 300 displaying the first application window from the first set of one or more applications adjacent to the second application window from the second set of one or more applications in the merged virtual desktop (e.g., shown in FIG. 12C, where calendar application is displayed adjacent to the web browser window).

In some embodiments, displaying the merged virtual desktop comprises in accordance with a determination that the input includes dragging the representation of the second virtual desktop onto a representation of the first virtual desktop (e.g., as described above with reference to FIG. 9A-9B, where the device detects a drag input dragging the representation 801 of calendar desktop onto the representation 701 of browser virtual desktop), the device 300 displays the second set of application windows in front of the first set of application windows in the merged virtual desktop (e.g., as described above with reference to FIG. 9C, where the calendar application 803 is displayed in front of the web browser windows 703, 705). In accordance with a determination that the input includes dragging the representation of the first virtual desktop onto the representation of the second virtual desktop (e.g., as described above with reference to FIG. 10A-10B, where the device detects a drag input dragging the representation 701 of browser desktop onto the representation 801 of calendar virtual desktop), the device 300 displays the first set of application windows in front of the second set of application windows in the merged virtual desktop (e.g., as described above with reference to FIG. 10C, where the web browser windows 703, 705 are displayed in front of the calendar application 803).

In some embodiments, displaying the merged virtual desktop comprises the device 300 detecting an input moving a respective application window from the first set of one or more open application windows from a first location in the merged virtual desktop to a second location in the merged virtual desktop (e.g., as described above with reference to FIGS. 11A-11B, where the web browser window 705 is moved from a first location to a second location in merged virtual desktop 1000). In response to detecting the input moving the respective application window, the device 300 moves the application window in the merged virtual desktop. After moving the respective application window in the merged virtual desktop, the device 300 detects an input to separate the merged virtual desktop into the first virtual desktop and the second virtual desktop. In response to detecting the input to separate the merged virtual desktop, the device 300 separates the merged virtual desktop. After separating the merged virtual desktop, the device 300 displays the first virtual desktop and wherein the respective window is displayed in the second location on the first virtual desktop (e.g., as described above with reference to FIG. 11C, where the web browser window 705 is maintained at the second location in virtual desktop 700).

In some embodiments, the first virtual desktop is associated with a first application. While the device displays the second virtual desktop, the device 300 detects a first selection of a representation of the first virtual desktop. The device 300 displays the first virtual desktop in accordance with detecting the selection of the first selection. The first virtual desktop includes the first set of one or more open application windows. The device 300 detects a second selection of the representation of the first virtual desktop and displays a first application specific menu associated with the first application (e.g., as described above with reference to FIG. 14, where a menu of the web browser application is displayed).

In some embodiments, the device 300 displays a first icon representing a minimized window of the first virtual desktop and a second icon representing a minimized window of the second virtual desktop along an edge of the display (e.g., as described above with reference to FIG. 13, icons 1301, 1302, and 1303 represent minimized windows).

The operations described above with reference to FIG. 15 are, optionally, implemented by components depicted in FIGS. 1A-1B, FIG. 3, and FIG. 16. For example, detection operations 1503, and displaying operations 1501, 1505 are, optionally, implemented by event sorter 170, event recognizer 180, and event handler 190. Event monitor 171 in event sorter 170 detects an input, and event dispatcher module 174 delivers the event information to application 136-1. A respective event recognizer 180 of application 136-1 compares the event information to respective event definitions 186, and determines whether an input corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B, 3, and 16.

Figure 16:
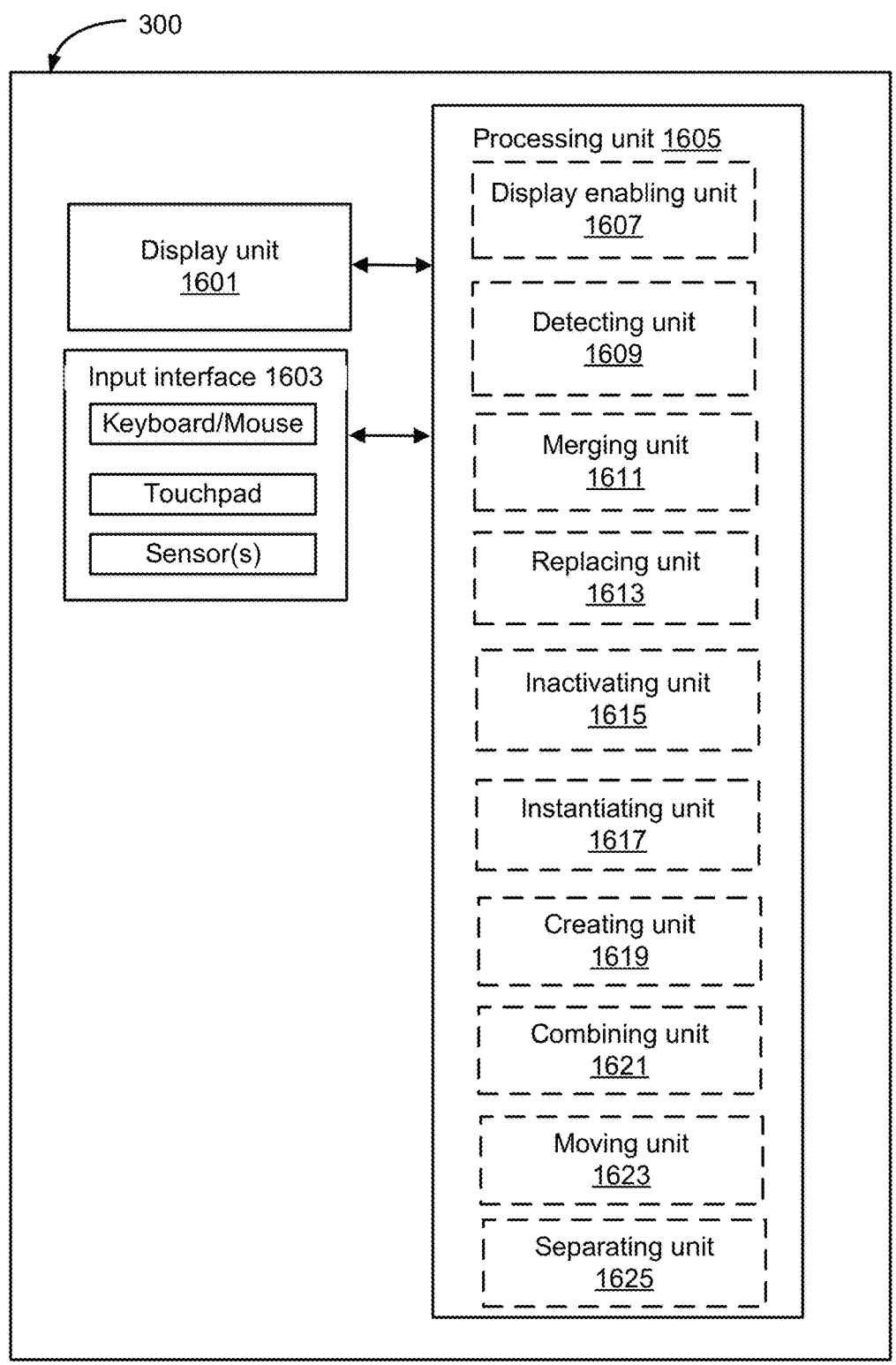
FIG. 16 is a functional block diagram of an electronic device in accordance with some embodiments.

As mentioned above, the operations described with reference to FIG. 15 optionally are implemented by components depicted in FIG. 16. In accordance with some embodiments, FIG. 16 shows a functional block diagram of device 300 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 16 are, optionally, combined or separated into sub-blocks to implement the principles of the various described embodiments. Therefore, the description herein optionally supports any possible combination or separation or further definition of the functional blocks described herein.

As shown in FIG. 16, the device 300 includes a display unit 1601 configured to display an application, an input interface 1603 (e.g., keyboard/mouse, touchpad, and/or sensor(s)) configured to receive user inputs, and a processing unit 1605 coupled to the display unit 1601 and the input interface 1603. In some embodiments, the processing unit 1605 includes a display enabling unit 1607, a detecting unit 1609, a merging unit 1611, a replacing unit 1613, an inactivating unit 1615, an instantiating unit 1617, a creating unit 1619, a combining unit 1621, a moving unit 1623, and a separating unit 1625.

The processing unit 1605 concurrently displays 1501 (e.g., using the display enabling unit 1607) a first virtual desktop that includes a first set of one or more open application windows and displays (e.g., using the display enabling unit 1607) a representation of a second virtual desktop that includes a second set of one or more open application windows. While concurrently displaying the first virtual desktop and the representation of the second virtual desktop, the processing unit 1605 detects (e.g., using the detecting unit 1609) an input that includes a selection of the representation of the second virtual desktop. In response to detecting the input, in accordance with a determination that the input meets virtual desktop merge criteria, the processing unit 1605 displays (e.g., using the display enabling unit 1607) a merged virtual desktop. The merged virtual desktop includes the first set of application windows and the second set of application windows. In some embodiments, the processing unit 1605 merges (e.g., using the merging unit 1611) a representation of the first virtual desktop with the representation of the second virtual desktop in accordance with a determination that the input meets the virtual desktop merge criteria.

In accordance with a determination that the input does not meet the virtual desktop merge criteria, the processing unit 1605 switches from displaying the first virtual desktop including the first set of application windows to displaying the second virtual desktop including the second set of application windows (e.g., using the display enabling unit 1607). While the processing unit 1605 displays the second virtual desktop, the processing unit 1605 displays a representation of the first virtual desktop (e.g., using the display enabling unit 1607).

In some embodiments, the representation of the first virtual desktop includes a first tab control, the representation of the second virtual desktop includes a second tab control, and the merged virtual desktop is associated with a representation of the merged virtual desktop that includes a third tab control. The first tab control associated with the first virtual desktop, the second tab control associated with the second virtual desktop, and the third tab control associated with the merged virtual desktop optionally are displayed in a tab display region by the display unit 1601. In some embodiments, the first tab control and the second tab control are each associated with an application.

In some embodiments, detecting the input comprises the processing unit 1605 detecting (e.g., using the detecting unit 1609) a selection of the second tab control and detecting (e.g., using the detecting unit 1609) movement of the selected tab control onto the first tab control signifying a request to merge the first virtual desktop and the second virtual desktop.

In some embodiments, while displaying the first virtual desktop, the processing unit 1605 displays (e.g., using the display enabling unit 1607) a representation of an application launching interface. The processing unit 1605 detects (e.g., using the detecting unit 1609) a selection of the representation of the application launching interface. In response to detecting selection of the representation of the application launching interface, the processing unit 1605 replaces (e.g., using the replacing unit 1613) display of the first virtual desktop with the application launching interface. The application launching interface optionally includes a plurality of icons associated with corresponding applications. In some embodiments, the plurality of icons are displayed across a plurality of pages displayed within the application launching interface.

In some embodiments, the processing unit 1605 detects (e.g., using the detecting unit 1609) an input selecting a first icon from the plurality of icons displayed within the application launching interface. In accordance with detecting the input selecting the first icon, the processing unit 1605 inactivates (e.g., using the inactivating unit 1615) the representation of the application launching interface to no longer display the application launching interface including the plurality of icons on the display. In some embodiments, the representation of the application launching interface is a fourth tab control. The processing unit 1605 instantiates (e.g., using the instantiating unit 16175) the first virtual desktop that includes a first application associated with the selected first icon. The processing unit 1605 creates (e.g., using the creating unit 1619) the first tab control representing the first virtual desktop. The processing unit 1605 concurrently displays (e.g., using the display enabling unit 1607) the fourth tab control in an inactive state and the first tab control in an active state.

In some embodiments, the processing unit 1605 displays (e.g., using the display enabling unit 1607) an application launch user interface object for launching a third application in a respective user interface that does not include a third virtual desktop for the third application. The processing unit 1605 detects (e.g., using the detecting unit 1609) activation of the application launch user interface object. In response to detecting activation of the application launch user interface object, in accordance with a determination that there is a preexisting third virtual desktop for the third application, the processing unit 1605 replaces display of the respective user interface with the preexisting third virtual desktop (e.g., using the display enabling unit 1607). In accordance with a determination that there is not a preexisting third virtual desktop for the third application, the processing unit 1605 replaces display of the respective user interface with a new third virtual desktop for the third application (e.g., using the display enabling unit 1607).

In some embodiments, the first set of one or more application windows are displayed in a first arrangement in the first virtual desktop and the second set of one or more application windows are displayed in a second arrangement in the second virtual desktop. Displaying the merged virtual desktop comprises the processing unit 1605 combining (e.g., using the combining unit 1621) the first set of one or more application windows with the second set of one or more application windows while maintaining the first arrangement and the second arrangement.

In some embodiments, at least one of a first application window from the first set of one or more application windows and a second application window from the second set of one or more application windows is displayed in a full screen mode. Displaying the merged virtual desktop comprises in some embodiments the processing unit 1605 displaying (e.g., using the display enabling unit 1607) the first application window from the first set of one or more applications adjacent to the second application window from the second set of one or more applications in the merged virtual desktop.

In some embodiments, displaying the merged virtual desktop comprises in accordance with a determination that the input includes dragging the representation of the second virtual desktop onto a representation of the first virtual desktop, the processing unit 1605 displays (e.g., using the display enabling unit 1607) the second set of application windows in front of the first set of application windows in the merged virtual desktop. In accordance with a determination that the input includes dragging the representation of the first virtual desktop onto the representation of the second virtual desktop, the processing unit 1605 displays (e.g., using the display enabling unit 1607) the first set of application windows in front of the second set of application windows in the merged virtual desktop.

In some embodiments, displaying the merged virtual desktop comprises the processing unit 1605 detecting (e.g., using the detecting unit 1609) an input moving a respective application window from the first set of one or more open application windows from a first location in the merged virtual desktop to a second location in the merged virtual desktop. In response to detecting the input moving the respective application window, the processing unit 1605 moves (e.g., using the moving unit 1623) the application window in the merged virtual desktop. After moving the respective application window in the merged virtual desktop, the processing unit 1605 detects (e.g., using the detecting unit 1609) an input to separate the merged virtual desktop into the first virtual desktop and the second virtual desktop. In response to detecting the input to separate the merged virtual desktop, the processing unit 1605 separates (e.g., using the separating unit 1625) the merged virtual desktop. After separating the merged virtual desktop, the processing unit 1605 displays (e.g., using the display enabling unit 1607) the first virtual desktop and wherein the respective window is displayed in the second location on the first virtual desktop.

In some embodiments, the first virtual desktop is associated with a first application. While the processing unit 1605 displays the second virtual desktop, the processing unit 1605 detects (e.g., using the detecting unit 1609) a first selection of a representation of the first virtual desktop. The processing unit 1605 displays (e.g., using the display enabling unit 1607) the first virtual desktop in accordance with detecting the selection of the first selection. The first virtual desktop includes the first set of one or more open application windows. The processing unit 1605 detects (e.g., using the detecting unit 1609) a second selection of the representation of the first virtual desktop and displays (e.g., using the display enabling unit 1607) a first application specific menu associated with the first application.

In some embodiments, the processing unit 1605 displays (e.g., using the display enabling unit 1607) a first icon representing a minimized window of the first virtual desktop and a second icon representing a minimized window of the second virtual desktop along an edge of the display.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

Any of the steps, operations, or processes described herein may be performed or implemented with one or more hardware or software modules, alone or in combination with other devices. In some embodiments, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

Embodiments of the invention may also relate to a computer data signal embodied in a carrier wave, where the computer data signal includes any embodiment of a computer program product or other data combination described herein. The computer data signal is a product that is presented in a tangible medium or carrier wave and modulated or otherwise encoded in the carrier wave, which is tangible, and transmitted according to any suitable transmission method.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A non-transitory computer readable storage medium storing one or more programs, the one or more programs comprising instructions, which when executed by an electronic device with a display, cause the electronic device to:
    display a first virtual desktop that includes concurrently displaying, on the display:
        a first set of two or more open application windows in a first arrangement including displaying a first application window at a first location relative to the display and a second application window at a second location relative to the display; and
        a representation of a second virtual desktop;
    while displaying the first virtual desktop, receive a request to display the second virtual desktop;
    in response to the request to display the second virtual desktop, display, the second virtual desktop including a second set of two or more open application windows in a second arrangement including displaying a third application window at a third location relative to the display and a fourth application window at the fourth location relative to the display; and
        a representation of the first virtual desktop;
    while concurrently displaying the second virtual desktop and the representation of the first virtual desktop, detect an input that includes a selection of the representation of the first virtual desktop; and
    in response to detecting the input: in accordance with a determination that the input meets virtual desktop merge criteria, display a merged virtual desktop, the merged virtual desktop including the first set of two or more application windows and the second set of two or more application windows, wherein the merged virtual desktop maintains the first arrangement of the first set of two or more application windows and the second arrangement of the second set of two or more application windows relative to the display; and
    in accordance with a determination that the input does not meet the virtual desktop merge criteria, switch from displaying the second virtual desktop including the second set of two or more application windows to displaying the first virtual desktop including the first set of two or more application windows.

2. The non-transitory computer readable storage medium of claim 1, in response to detecting the input, in accordance with a determination that the input meets the virtual desktop merge criteria, the instructions when executed by the electronic device further cause the electronic device to:
    merge the representation of the first virtual desktop with the representation of the second virtual desktop.

3. The non-transitory computer readable storage medium of claim 1, wherein the representation of the first virtual desktop includes a first tab control, the representation of the second virtual desktop includes a second tab control, and the merged virtual desktop is associated with a representation of the merged virtual desktop that includes a third tab control.

4. The non-transitory computer readable storage medium of claim 3, wherein the first tab control associated with the first virtual desktop, the second tab control associated with the second virtual desktop, and the third tab control associated with the merged virtual desktop are displayed in a tab display region.

5. The non-transitory computer readable storage medium of claim 3, wherein the first tab control and the second tab control are each associated with an application.

6. The non-transitory computer readable storage medium of claim 3, wherein detecting the input comprises:
    detecting a selection of the second tab control; and
    detecting movement of the selected second tab control onto the first tab control signifying a request to merge the first virtual desktop and the second virtual desktop.

7. The non-transitory computer readable storage medium of claim 1, wherein the instructions when executed by the electronic device further cause the electronic device to:
    while displaying the first virtual desktop, display a representation of an application launching interface;
    detect a selection of the representation of the application launching interface; and
    in response to detecting selection of the representation of the application launching interface, replace display of the first virtual desktop with the application launching interface, wherein the application launching interface includes a plurality of icons associated with corresponding applications.

8. The non-transitory computer readable storage medium of claim 7, wherein the plurality of icons are displayed across a plurality of pages displayed within the application launching interface.

9. The non-transitory computer readable storage medium of claim 7, wherein the instructions when executed by the electronic device further cause the electronic device to:
   detect an input selecting a first icon from the plurality of icons displayed within the application launching interface; in accordance with detecting the input selecting the first icon:
   inactivate the representation of the application launching interface to no longer display the application launching interface including the plurality of icons on the display, wherein the representation of the application launching interface is a fourth tab control;
   instantiate the first virtual desktop that includes a first application associated with the selected first icon;
   create the first tab control representing the first virtual desktop; and
   concurrently display the fourth tab control in an inactive state and the first tab in an active state.

10. The non-transitory computer readable storage medium of claim 1, wherein the instructions when executed by the electronic device further cause the electronic device to:
   display an application launch user interface object for launching a third application in a respective user interface that does not include a third virtual desktop for the third application;
   detect activation of the application launch user interface object; and in response to detecting activation of the application launch user interface object:
   in accordance with a determination that there is a preexisting third virtual desktop for the third application, replace display of the respective user interface with the preexisting third virtual desktop; and
   in accordance with a determination that there is not a preexisting third virtual desktop for the third application, replace display of the respective user interface with a new third virtual desktop for the third application.

11. The non-transitory computer readable storage medium of claim 1, wherein displaying the merged virtual desktop comprises:
   in accordance with a determination that the input includes dragging the representation of the second virtual desktop onto the representation of the first virtual desktop, displaying the second set of application windows in front of the first set of application windows in the merged virtual desktop; and
   in accordance with a determination that the input includes dragging the representation of the first virtual desktop onto the representation of the second virtual desktop, displaying the first set of application windows in front of the second set of application windows in the merged virtual desktop.

12. The non-transitory computer readable storage medium of claim 1, wherein the instructions when executed by the electronic device further cause the electronic device to, while displaying the merged virtual desktop:
   detect an input moving the first application window from the first location in the merged virtual desktop to a fifth location in the merged virtual desktop;
   in response to detecting the input moving the first application window, move the first application window in the merged virtual desktop;
   after moving the first application window in the merged virtual desktop, detect an input to separate the merged virtual desktop into the first virtual desktop and the second virtual desktop;
   in response to detecting the input to separate the merged virtual desktop, separate the merged virtual desktop; and
   after separating the merged virtual desktop, display the first virtual desktop, wherein the first application window is displayed in the fifth location on the first virtual desktop.

13. The non-transitory computer readable storage medium of claim 1, wherein at least one of the first application window from the first set of two or more application windows and the third application window from the second set of two or more application windows is displayed in a full screen mode and wherein displaying the merged virtual desktop comprises:
   displaying the first application window from the first set of two or more applications adjacent to the third application window from the second set of two or more applications in the merged virtual desktop.

14. The non-transitory computer readable storage medium of claim 1, wherein the first virtual desktop is associated with a first application and wherein the instructions when executed by the electronic device further cause the electronic device to, while displaying the second virtual desktop:
   detect a first selection of the representation of the first virtual desktop;
   display the first virtual desktop in accordance with detecting the selection of the first selection, the first virtual desktop including the first set of two or more open application windows;
   detect a second selection of the representation of the first virtual desktop; and
   display a first application specific menu associated with the first application.

15. The non-transitory computer readable storage medium of claim 1, wherein the instructions when executed by the electronic device further cause the electronic device to:
   display a first icon representing a minimized window of the first virtual desktop and a second icon representing a minimized window of the second virtual desktop along an edge of the display.

16. The non-transitory computer readable storage medium of claim 1, wherein displaying the merged virtual desktop comprises:
   interleaving the first set of two or more application windows with the second set of two or more application windows.

17. The non-transitory computer readable storage medium of claim 1, wherein displaying the merged virtual desktop comprises overlaying the first virtual desktop on top of the second virtual desktop.

18. The non-transitory computer readable storage medium of claim 1, wherein the instructions further cause the electronic device to:
   determine whether a user input is detected in relation to the merged virtual desktop within a threshold amount of time after displaying the merged virtual desktop; and
   in accordance with a determination that a user input is not detected within the threshold amount of time after displaying the merged virtual desktop, cease displaying the merged virtual desktop, and display the second virtual desktop.

19. The non-transitory computer readable storage medium of claim 1, wherein detecting the input comprises:

detecting a pinch gesture that includes:
  detecting a first contact at a location corresponding to the representation of the first virtual desktop and a second contact at a location corresponding to the representation of the second virtual desktop; and
  detecting movement of the first contact and the second contact towards each other.

20. The non-transitory computer readable storage medium of claim 1, wherein the instructions further cause the electronic device to:
  detect a user input that corresponds to a request to separate the merged virtual desktop; and
  in response to detecting the request to separate the merged virtual desktop:
  cease displaying the merged virtual desktop, and
  display one of the first virtual desktop and the second virtual desktop.

21. A computer-implemented method comprising: at an electronic device with a display:
  displaying a first virtual desktop that includes concurrently displaying, on the display:
  a first set of two or more open application windows in a first arrangement including displaying a first application window at a first location relative to the display and a second application window at a second location relative to the display; and
  a representation of a second virtual desktop;
  while displaying the first virtual desktop, receiving a request to display the second virtual desktop;
  in response to the request to display the second virtual desktop, displaying, the second virtual desktop including concurrently displaying, on the display:
  a second set of two or more open application windows in a second arrangement including displaying a third application window at a third location relative to the display and a fourth application window at the fourth location relative to the display; and
  a representation of the first virtual desktop;
  while concurrently displaying the second virtual desktop and the representation of the first virtual desktop, detecting an input that includes a selection of the representation of the first virtual desktop; and
  in response to detecting the input:
  in accordance with a determination that the input meets virtual desktop merge criteria, displaying a merged virtual desktop, the merged virtual desktop including the first set of two or more application windows and the second set of two or more application windows, wherein the merged virtual desktop maintains the first arrangement of the first set of two or more application windows and the second arrangement of the second set of two or more application windows relative to the display; and
  in accordance with a determination that the input does not meet the virtual desktop merge criteria, switch from displaying the second virtual desktop including the second set of two or more application windows to displaying the first virtual desktop including the first set of two or more application windows.

22. An electronic device comprising:
  a display;
  one or more processors; memory; and
  one or more programs, wherein the one or more programs are stored in the memory and configured to be executed by the one or more processors, the one or more programs including instructions when executed by the electronic device cause the electronic device to:
  display a first virtual desktop that includes concurrently displaying, on the display:
  a first set of two or more open application windows in a first arrangement including displaying a first application window at a first location relative to the display and a second application window at a second location relative to the display; and
  a representation of a second virtual desktop
  while displaying the first virtual desktop, receive a request to display the second virtual desktop;
  in response to the request to display the second virtual desktop, display, the second virtual desktop including concurrently displaying, on the display:
  a second set of two or more open application windows in a second arrangement including displaying a third application window at a third location relative to the display and a fourth application window at the fourth location relative to the display; and
  a representation of the first virtual desktop;
  while concurrently displaying the second virtual desktop and the representation of the first virtual desktop, detect an input that includes a selection of the representation of the first virtual desktop; and
  in response to detecting the input:
  in accordance with a determination that the input meets virtual desktop merge criteria, display a merged virtual desktop, the merged virtual desktop including the first set of two or more application windows and the second set of two or more application windows, wherein the merged virtual desktop maintains the first arrangement of the first set of two or more application windows and the second arrangement of the second set of two or more application windows relative to the display; and
  in accordance with a determination that the input does not meet the virtual desktop merge criteria, switch from displaying the second virtual desktop including the second set of two or more application windows to displaying the first virtual desktop including the first set of two or more application windows.

* * * * *